Aug. 9, 1938.    E. HOPKINS    2,126,635
TELETICKET SYSTEM
Original Filed Oct. 26, 1929    8 Sheets-Sheet 1
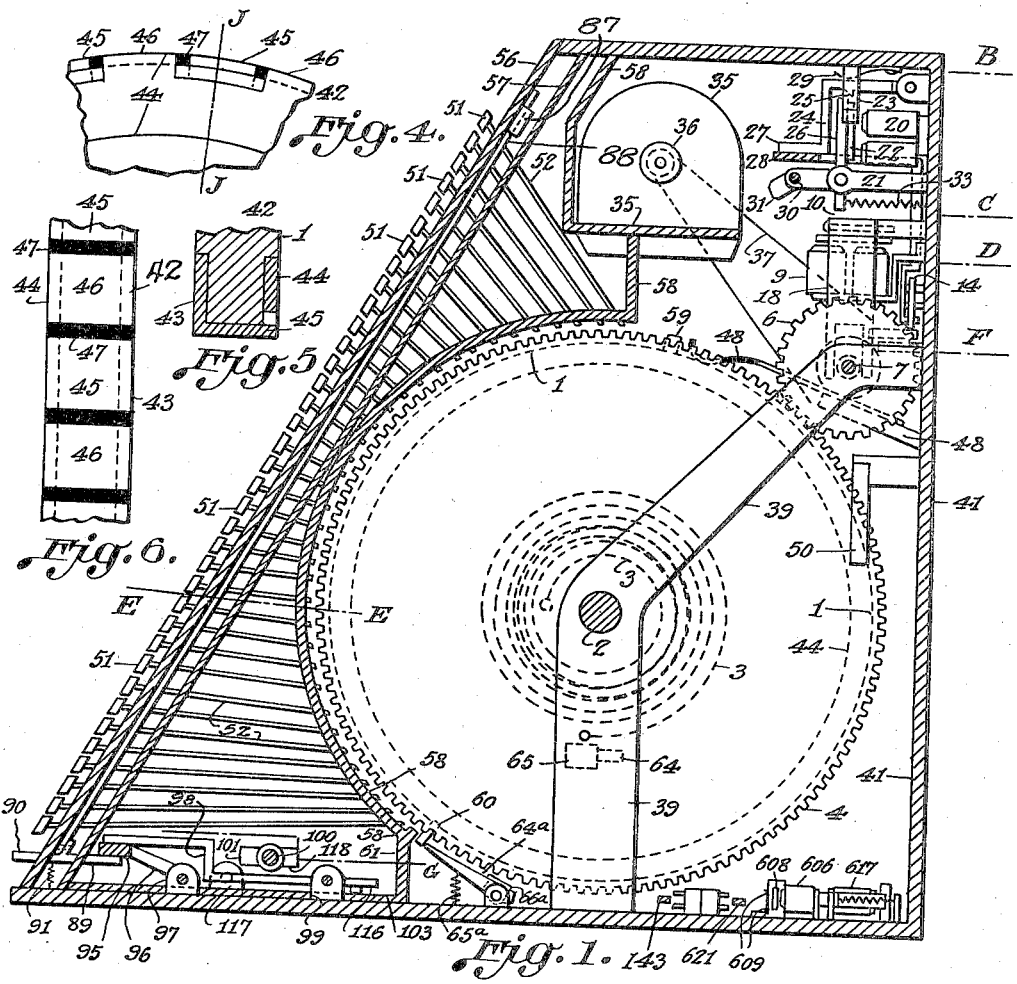
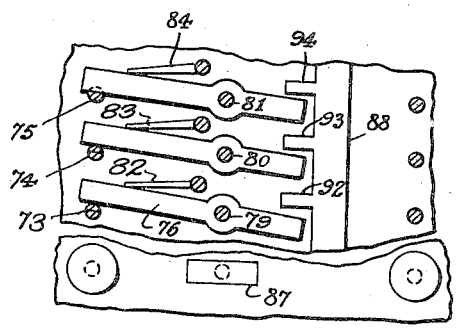
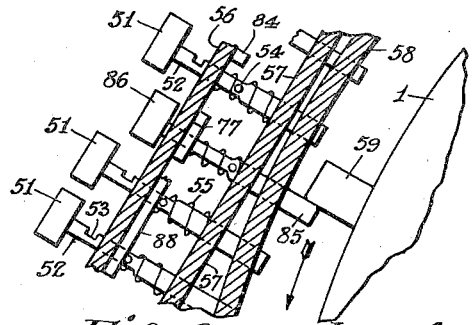
Inventor:
Edwin Hopkins Aug. 9, 1938.  E. HOPKINS  2,126,635
TELETICKET SYSTEM
Original Filed Oct. 26, 1929   8 Sheets—Sheet 2

Inventor.
Edwin Hopkins

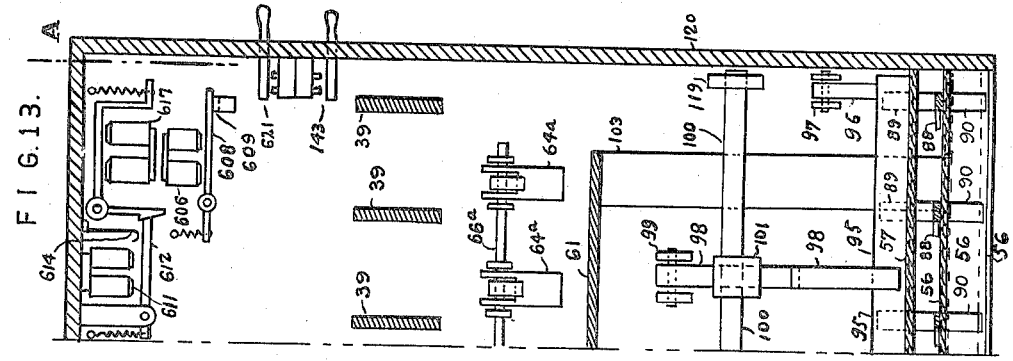

Aug. 9, 1938.  E. HOPKINS  2,126,635

TELETICKET SYSTEM

Original Filed Oct. 26, 1929   8 Sheets-Sheet 4

Inventor:
Edwin Hopkins

Aug. 9, 1938.  E. HOPKINS  2,126,635
TELETICKET SYSTEM
Original Filed Oct. 26, 1929   8 Sheets-Sheet 5

Inventor
Edwin Hopkins

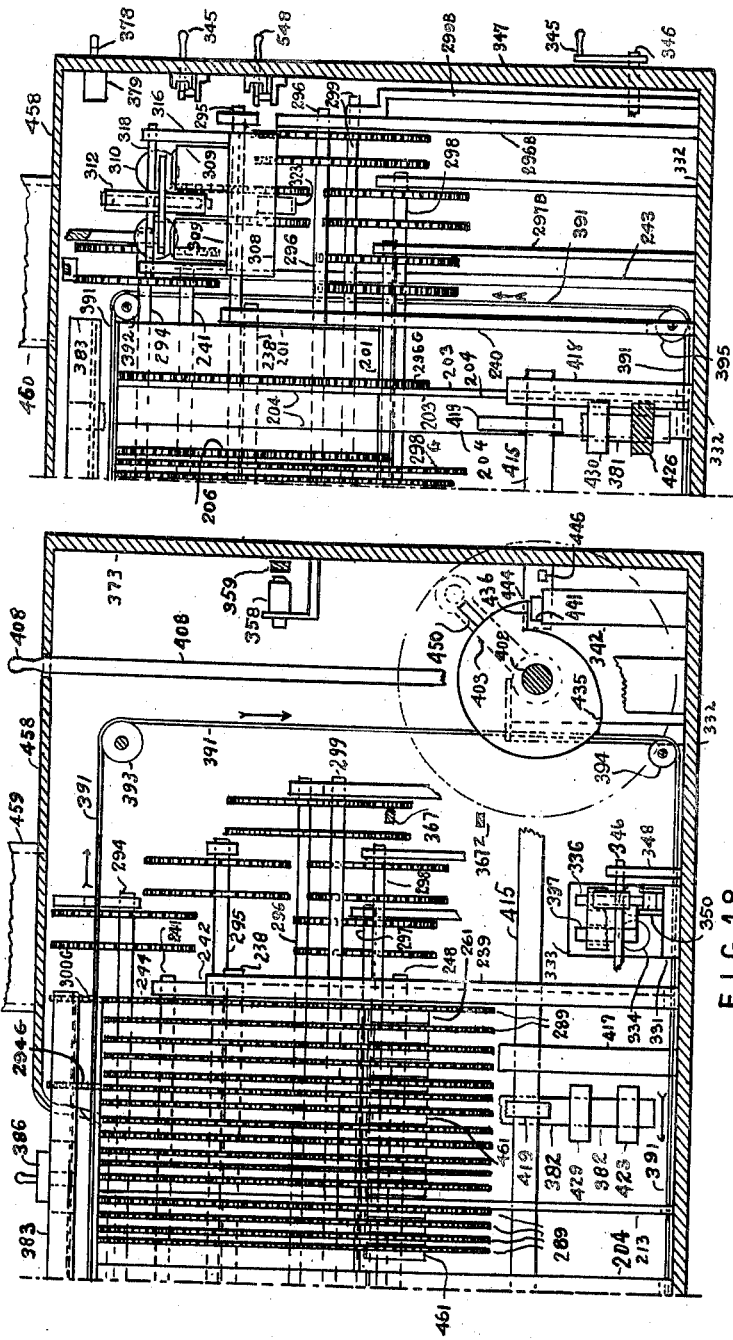
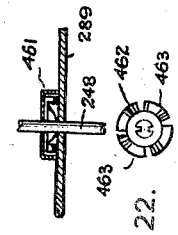
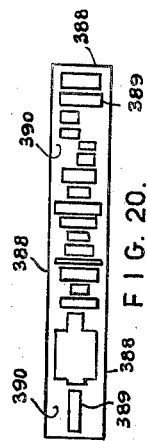

Aug. 9, 1938.  E. HOPKINS  2,126,635

TELETICKET SYSTEM

Original Filed Oct. 26, 1929    8 Sheets-Sheet 7

Inventor
Edwin Hopkins

Patented Aug. 9, 1938

2,126,635

UNITED STATES PATENT OFFICE 2,126,635

TELETICKET SYSTEM

Edwin Hopkins, New York, N. Y.

Original application October 26, 1929, Serial No. 402,714. Patent No. 2,004,112, dated June 11, 1935. Divided and this application June 4, 1935, Serial No. 24,890

17 Claims. (Cl. 178—4)

This is a divisional application of the following mentioned: Edwin Hopkins, application No. 402,714, filed October 26, 1929, Teleticket system, issue date of patent June 11, 1935 (allowed Sept. 20, 1934, issue extended three months): patent number to be 2,004,112.

The main purpose of my invention is to provide means for printing theatre tickets by telegraph at a number of stations located at various distances from the theatre. Thus stations in drug stores and elsewhere throughout a city may print tickets for any theatre in the system, the printing being under the control of the theatre to which tickets are desired.

In a system of eighty theatres fitted with sending apparatus and a thousand stores in which are located printing apparatus, any such station may telephone any theatre and when it is ascertained that the theatre has tickets acceptable to the purchaser visiting the station, the theatre sets the printing apparatus by telegraphic signals over the telephone wires and the station operator then operates the printer, the theatre operator automatically cancelling his ticket at the same time. The theatre operator's sending apparatus permits him to send signals which will only print tickets for his theatre. But he may have a printer and thus be able to secure tickets for any other theatre if desired by his patron.

It is also within my invention to keep a group of sending machines and supplies of tickets to all theatres at a central office, and outlying stations may obtain their tickets through the central station. In such case the sending apparatus is fitted with means for selling tickets for all theatres. One sender may be fitted for a small group of theatres and if a distant patrons does not wish seats available for any of these, the call may be switched to another small group without compelling the patron to telephone to a number of different theatres from the printing station.

The apparatus consists chiefly of a sending apparatus adapted to be set by its keys to send a series of electrical impulses in groups of alternating impulses, prolongations of one such impulse and dead spaces, from a series of sending discs coming into action automatically in succession, and a receiving-printing apparatus with a multiple number of type wheels adapted to be set to the printing position by the several groups of impulses, automatically in succession. When the type wheels are thus set the printer station operator prints the tickets by manual operation. The printer then clears itself automatically, but the sending operator by changing a single key may send the adjoining seat without resetting his apparatus, when he clears by manual operation when through, automatically cancelling the tickets sent.

Further features of the invention will be found set forth in detail hereinafter:

In carrying out my invention I find it generally desirable to employ the herein described apparatus and manufactures, but it is to be understood in carrying out the objects of my invention, less than all of the different means, mechanisms, and manufactures herein described may be employed for some uses, or parts only may be employed, or other mechanisms and manufactures similar may be employed and substituted, and while the preferred forms of my invention are shown, it is to be understood that many of the structural details and steps resorted to may be varied and many changes in details and steps resorted to without departing from the scope and spirit of my invention, nor do I limit myself to the specific devices, manufactures and methods shown, although I believe them especially suited to the ends to be attained by the invention.

The accompanying drawings are largely diagrammatical and are not to be considered as working drawings of the invention, but merely as illustrations of the principles of the invention. Many parts of the apparatus are omitted from particular figures and in particular figures different planes are taken and portions forward of the planes are indicated and the juncture of planes is not always indicated, for the purpose of clearness of illustration of the invention without the multiplication of drawings. Terms used in the singular imply the plural and vice versa when the context so indicates.

In the accompanying figures of drawings, illustrating a form of my invention and forming a part hereof, and in which the same reference numerals and letters indicate the same or corresponding parts:

Fig. 1 to Fig 13 inclusive, sheets one to three, illustrate the sending apparatus;

Fig. 1 is a sectional end elevation on line A of Fig. 13 looking towards the left end as illustrated in Fig. 11;

Fig. 2 is composed of an upper and lower part. The lower part is a plan of two keys of the keyboard and the front wall, and the upper part is a section with the face or front wall removed;

Fig. 3 is a vertical section of a portion of the keyboard on line H of Fig. 8;

Fig. 4 is a side elevation of a portion of a commutator disc;

Fig. 5 is a section of the same on line J of Fig. 4;

Fig. 6 is a plan of the periphery of same;

Fig. 11 is a sectional plan at different elevations. The upper part, beginning at the left, is on lines B, C, D, and F of Fig. 1, the front walls are shown in section on line E of Fig. 1 and the lower part is a skeletonized plan;

Fig. 12 is a plan, partly in section, to the right of the broken line. This indicates the commutator disc and brushes below line F of Fig. 1;

Fig. 13 is a sectional plan on line G of Fig. 1;

Figure 14:
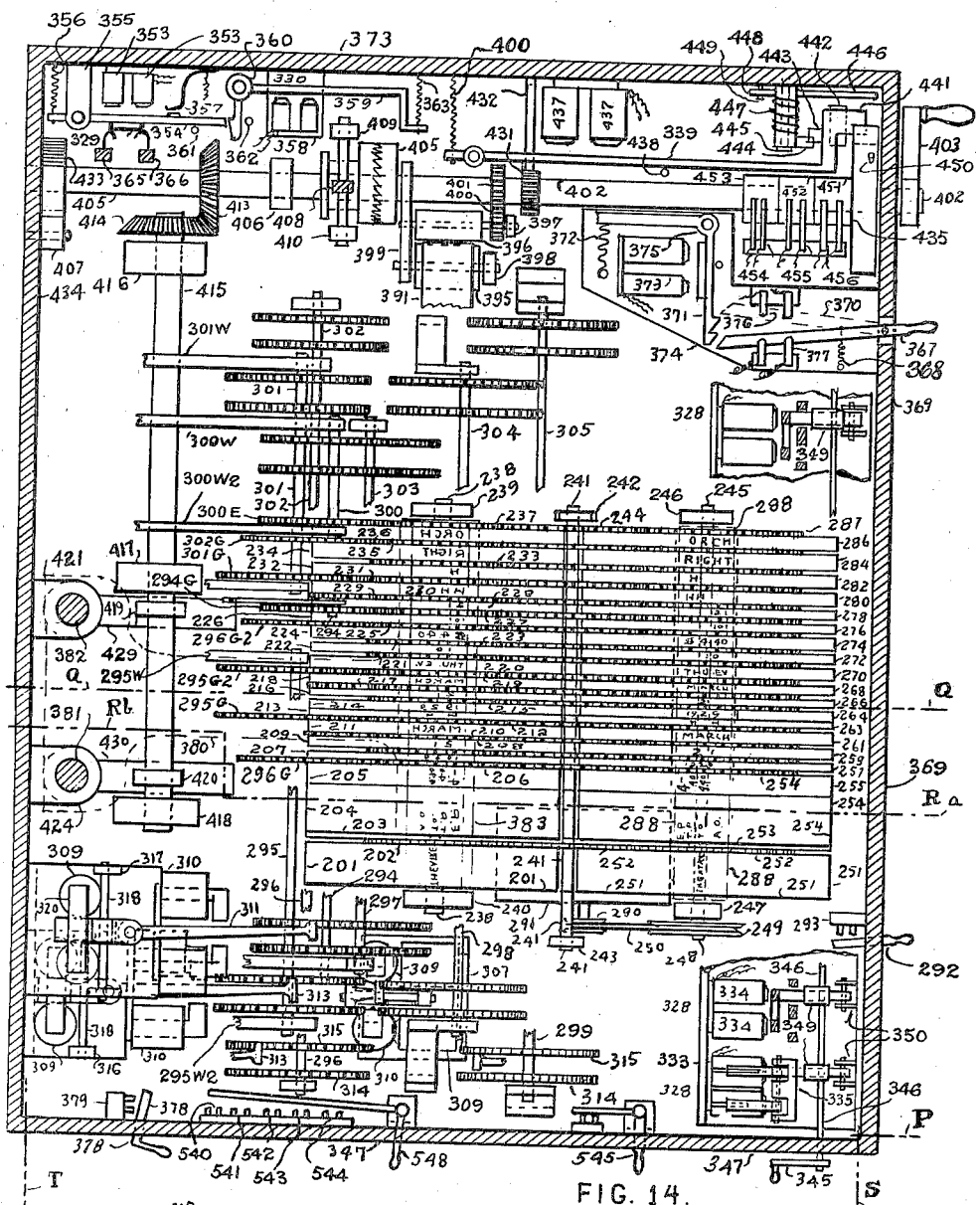
Figure 15:
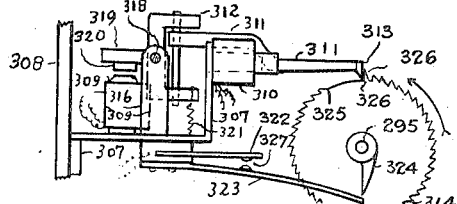
Figure 16:
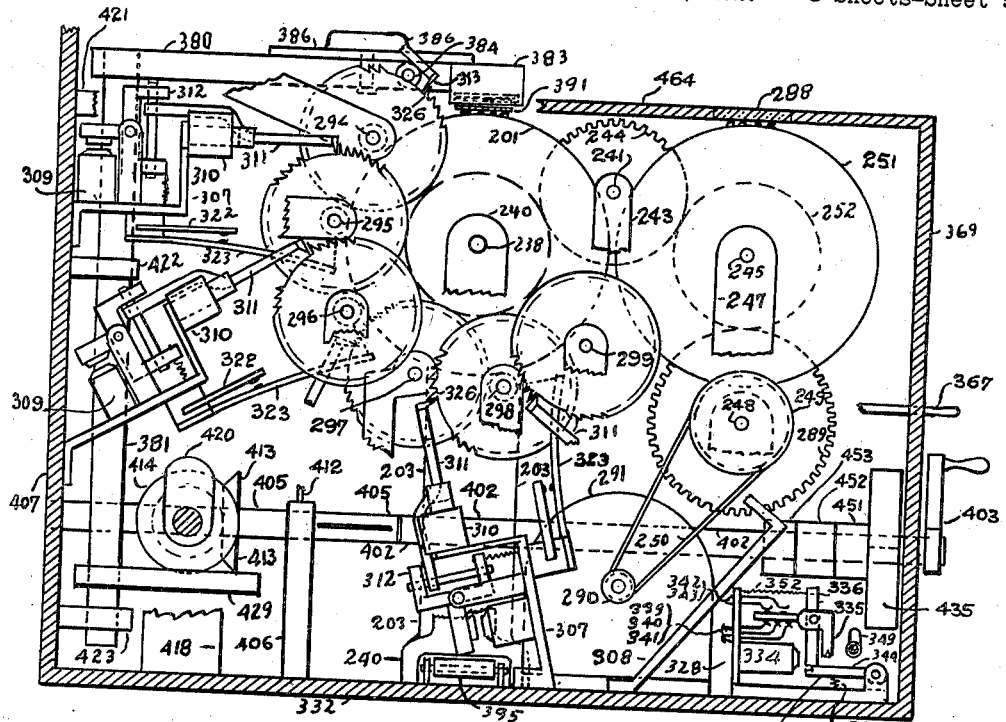
Figure 17:
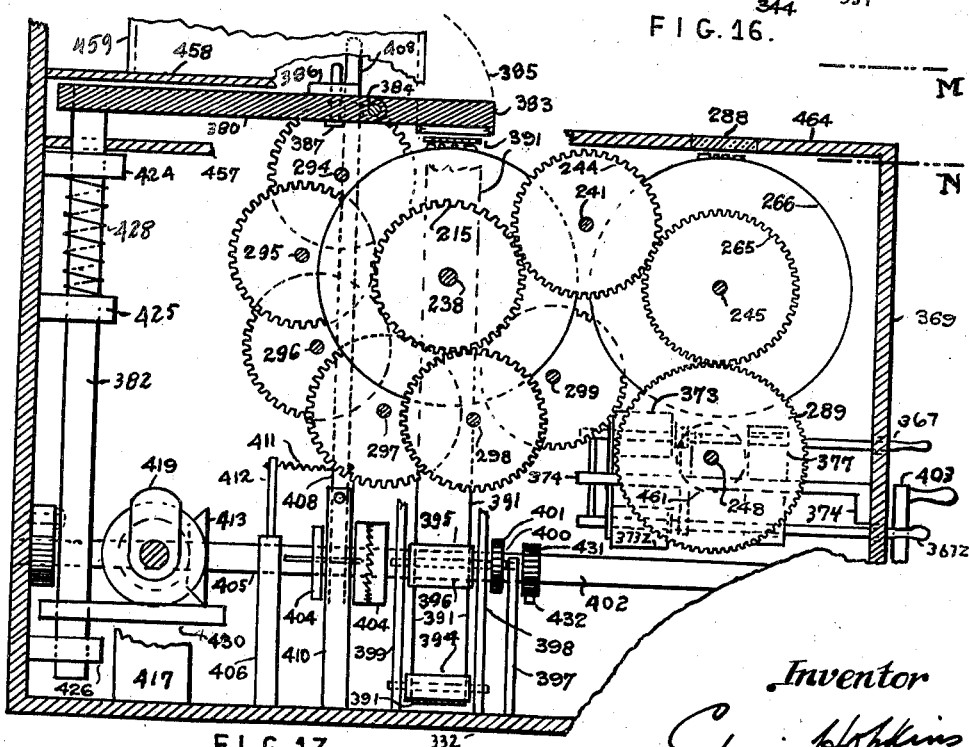
Figure 24:
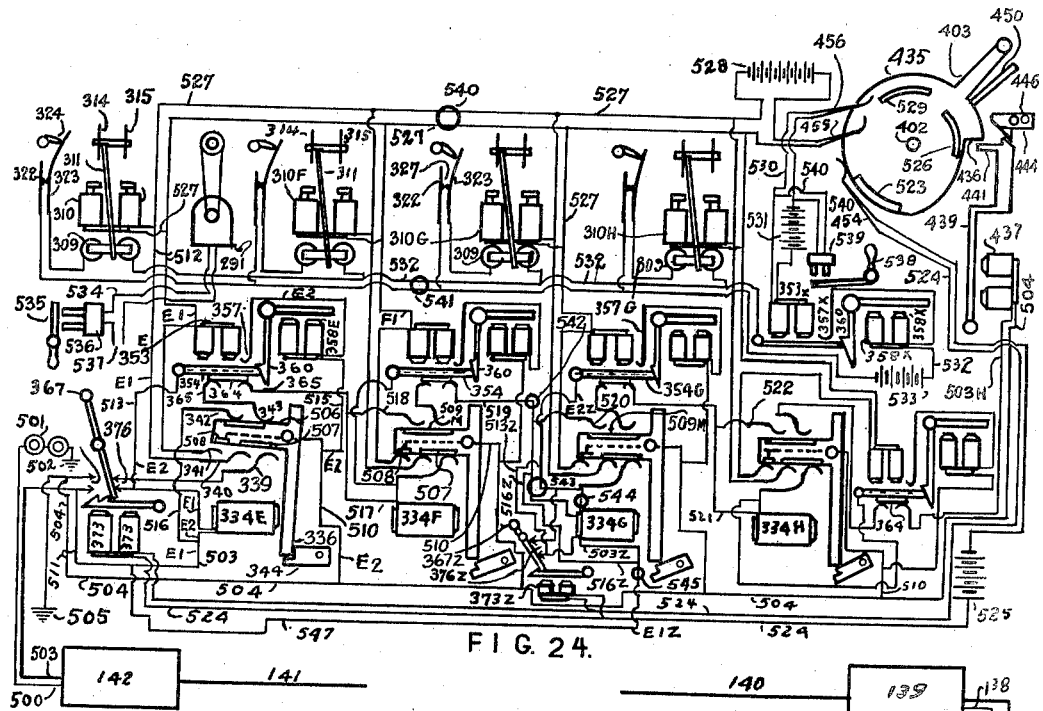
Figure 23:
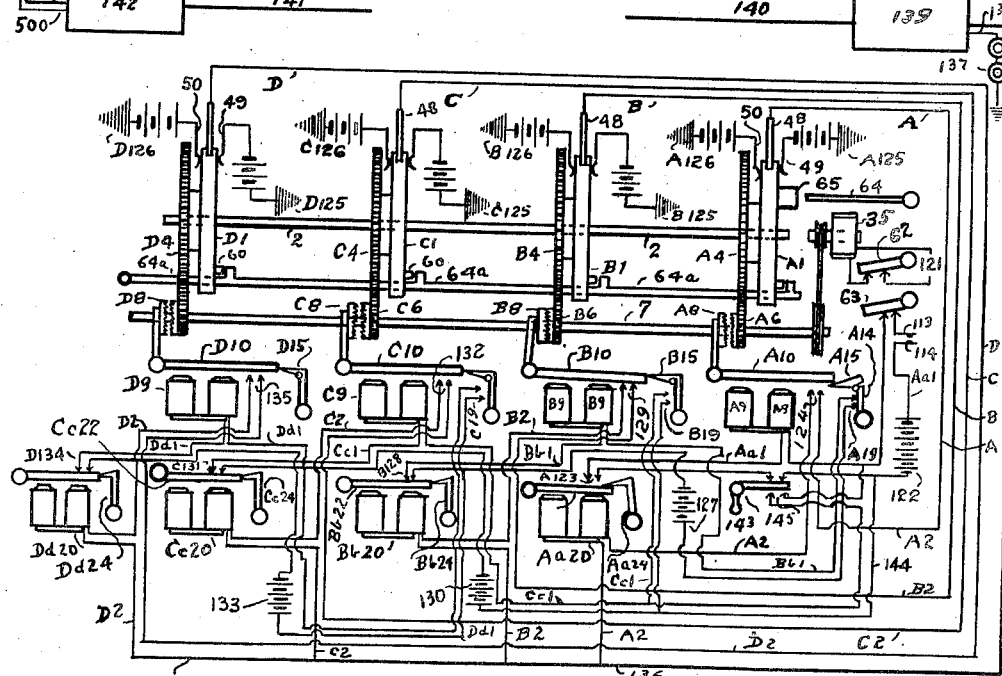
Figure 26:
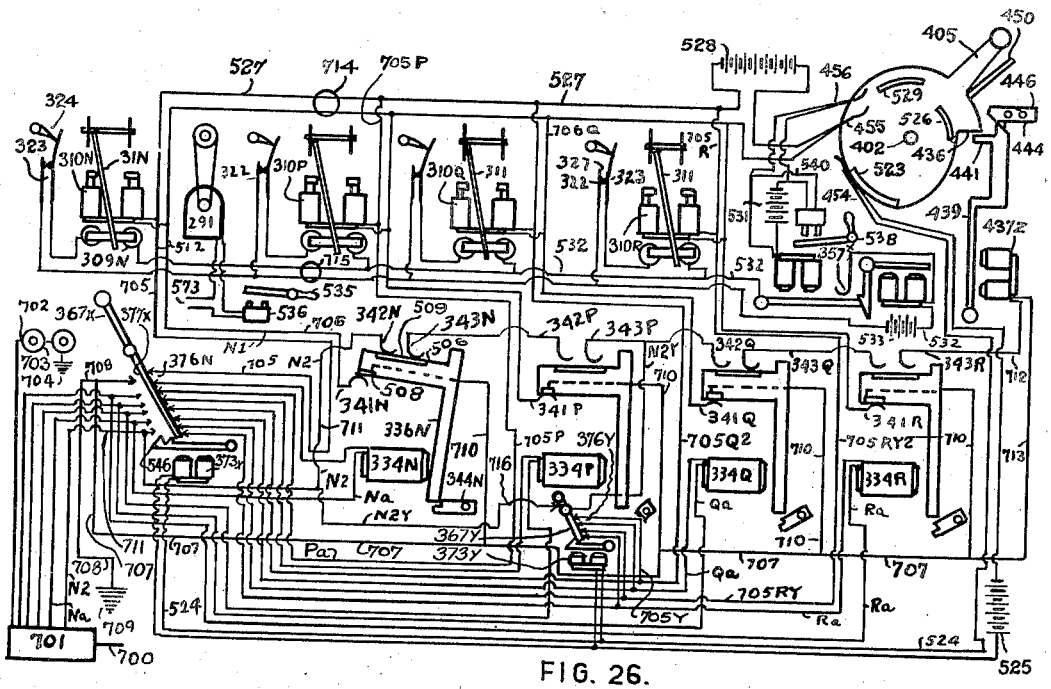
Figure 25:
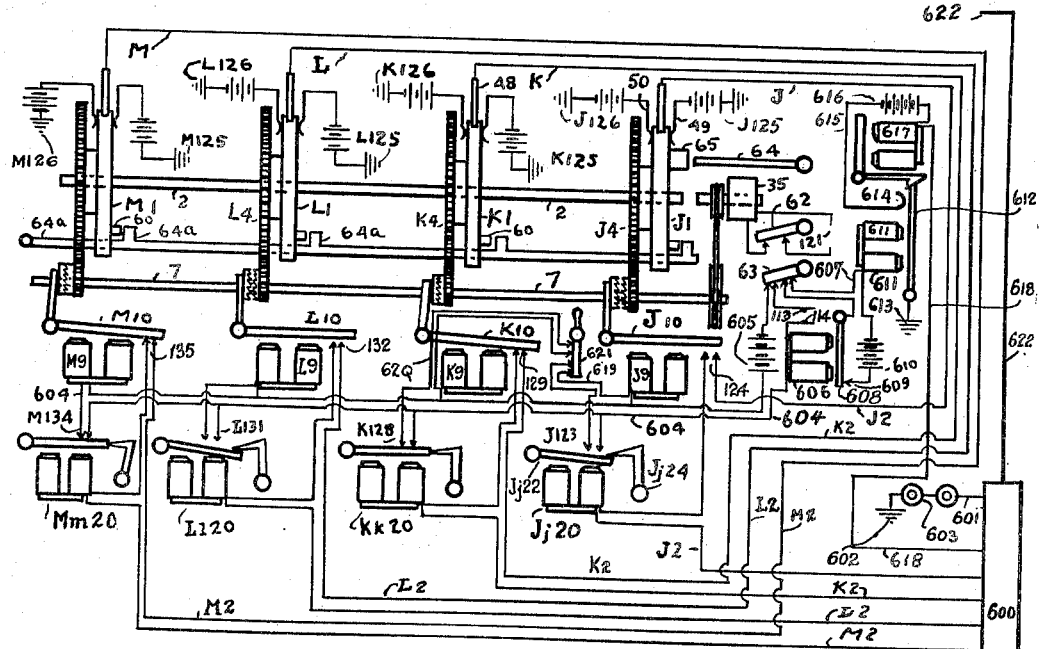

Figs. 14 to 22 inclusive illustrate the printer; sheets four to six inclusive:

Fig. 14 is a sectional plan on lines M and N of Fig. 17;

Fig. 15 is a side elevation of an escapement unit;

Fig. 6 is a sectional end elevation on line P of Fig. 14;

Fig. 17 is a sectional end elevation on line Q of Fig. 14;

Fig. 18 is a side sectional elevation of the manual printing crank end of the apparatus, taken from the end to line Ra looking at the right side of Fig. 14; on line S of Fig. 14;

Fig. 19 is a sectional side elevation of the other end of same taken from the end to line Rb of Fig. 14, on line T of Fig. 14;

Fig. 20 is a plan of a masking matrix or stencil for the printer arm;

Fig. 21 is a cross section of a friction drum used for the driving shaft;

Fig. 22 is a plan of a portion of Fig. 22;

Fig. 23 is a diagram of the electrical connections of the sending apparatus;

Fig. 24 is a diagram of the electrical connections of the printing apparatus;

Fig. 25 is a diagram of the electrical connections of the sending apparatus when multiple high frequency currents are used;

Fig. 26 is a diagram of the electrical connections of the printer when multiple high frequency currents are used.

The sending apparatus illustrated in Figs. 1 to 13 comprises twelve sending discs with commutators on their peripheries adapted to send alternating current to line. These commutator discs 1 are mounted to rotate freely on shaft 2. Attached to one side of the disc is retracting spring 3, and to the other side gear 4 through a friction drum 5, illustrated in detail in Figs. 9 and 10.

Fig. 1 is a sectional elevation on line A—A of Fig. 13. Fig. 11 is a sectional plan of the left end of the apparatus. Contact-breaking magnet 20 is shown on a plane approximately indicated by line B of Fig. 1. The clutch magnet 9 is shown on the plane indicated approximately by line C of Fig. 14 and the clutch arm and crowbeak-sector system on the plane indicated approximately by line D. The front portion is about on line E of Fig. 1.

Gear 4 is driven by spur gear 6, mounted to rotate freely on shaft 7. Slideably feathered to shaft 7 are clutches 8. These clutches drive spur gears 6 when thrown into engagement by clutch magnet 9, through bell crank lever 10.

Clutch magnets 9 are supported by an arm to rear wall 41 of framework 12. A table stud of the arm 11 supporting the clutch magnets carries contact springs 13, arranged so that the contact is made when the magnet is energized and broken when it is de-energized. Attached to bar 18 of bell crank armature lever 10 is a spring which tends to keep the clutch open, but which is overcome when the magnet is energized.

A description of the sequence of operations of these magnets, circuits, springs and mechanical parts will be given later in connection with diagram 25.

A crowbeak ratchet composed of arm 14 and beak 15 is mounted on a stud in framework 13, adapted to rotate in a vertical plane. A small spring at its axis tends to force arm 14 downward. Beak 15 is hinged to bar 14, so that its point is free to move towards the axis of bar 14, but a small spring acts in opposition to movement in that direction, the small spring being at its axis. The beak cannot move away from the axis of bar 14, by reason of shoulders at the axis of beak 15.

A table arm 16 extends from the framework towards the clutch, and carries sector 14, which is mounted on a stud in 16 to rotate partially in one direction or the other in the horizontal plane. The inner arm of lever arm 18 is bevelled to a median line, which pushes the apex of sector 17 back and forth as the clutch operates. As seen in Fig. 11 the clutch is open. Sector 17 is held in the normal median position by a small axis spring. When bar 18 moves to close the clutch 8, the apex of the sector is carried along with it until bar 18 passes it, when the sector flies back to normal. When 18 opens the clutch it carries the apex along in the other direction until it passes it and the sector flies back to its normal position.

The point of beak 15 rests on sector 17 at times in the cycle of operations and at other times on table 16.

Figure 7:
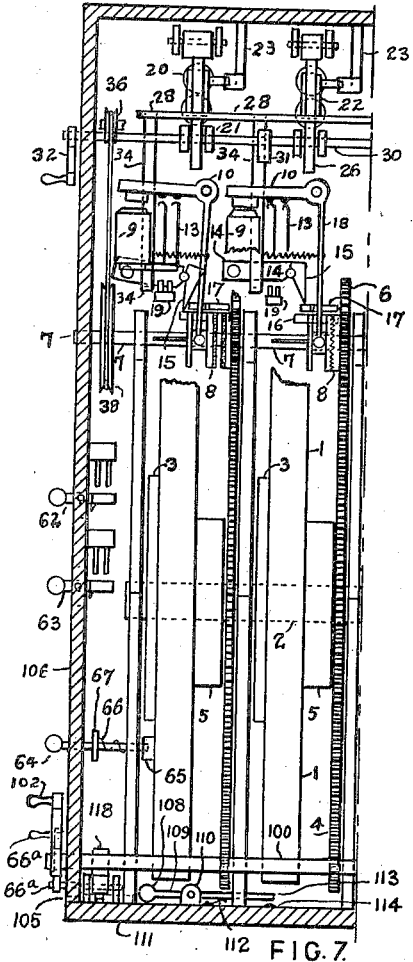
Fig. 7 is a longitudinal section from top to bottom through the left end of the apparatus with the front keyboard walls removed.
Figure 8:
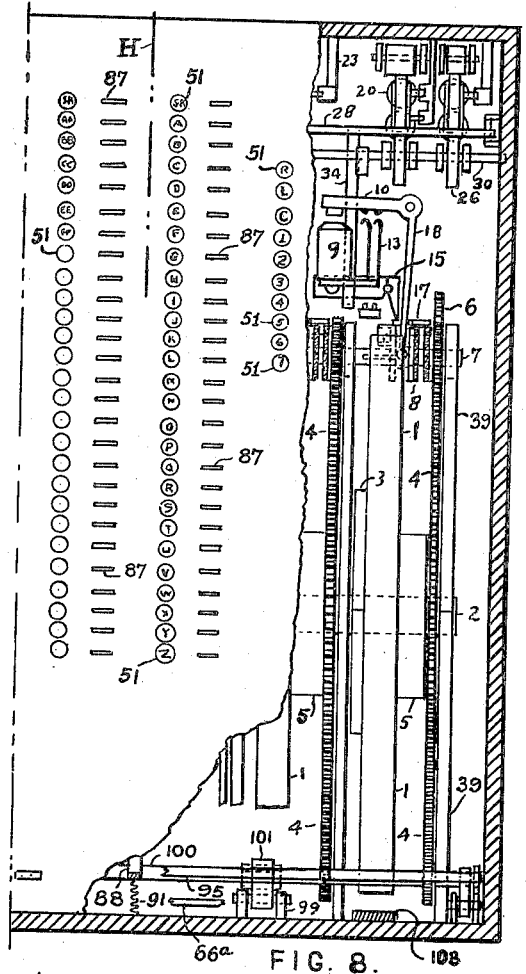
Fig. 8 is a similar section as regards the right side, while the left side, left of the broken line, is a front elevation of the middle of the apparatus.

Figs. 7 and 8 show the three positions assumed during operation. When the apparatus is cleared to begin functioning the clutch is open, the sector is in the median position and the crowbeak rests on the sector as shown in Fig. 8.

As shown in Fig. 7 right hand example, the clutch is closed. This drives the fan side of the sector to the left, sliding under beak 15, but not letting beak 15 fall to the table 16. These two examples show the clutch open at the outset and the clutch closed to operate the spur gear 6, the gear 4 and the disc 1. When disc 1 is stopped by a key, clutch magnet 9 is automatically de-energized and the spring of arm 18 throws the clutch out of engagement. This causes the fan side of the sector to move to the right, which permits beak 15 to fall to table 16. As this takes place arm 14 closes switch 19, which completes a local circuit to energize the clutch magnet of the next disc unit. Beak 15 is so hinged to bar 14 that it may be forced back in the position seen in the left example of Fig. 7.

In Fig. 7 the left hand example of beak and clutch have operated and the clutch has been disengaged. All the units will assume this position when the whole apparatus has functioned.

The right hand example of Fig. 7 is in operation and the example in Fig. 8 is awaiting operation. It is in the position assumed after being cleared by manual operation from the position in the left hand example of Fig. 7.

Contact breaking magnet 20 is attached to the framework by a lug, and standards 21 carry armature 22 on lever 26, making contact with pillar 23 for the line alternating circuit. The breaking of this contact breaks the line. Ratchet arm 24 is pivoted to lugs in the framework, and has tooth, 25, which engages the end of armature lever 26. Thus when the magnet is energized bar 26 is drawn in and caught by the tooth 25 and contact at pillar 23 is permanently broken even after magnet 20 is de-energized. Foot 27 of arm 24 rests on universal lifter bar 28, extending across the whole apparatus, and it supports all the feet 27, which are depressed by springs 29. Spindle 30, rotating in the sides of the framework and in standards 21 carries cams 31 affixed to it. Manually operable crank 32 is affixed to spindle 30 and when it is rotated it lifts all the feet 27 and arms 24 and allows springs 33 to draw back the armature lever and re-make the contacts at pillars 23. This manual operation of crank 32 takes place after the mechanism has functioned in order to clear the levers for the next operation.

Universal bar lifter 28 has attached to it arms 34, which extend down and under crowbeak bar 14 and lift the crowbeak levers at the same time ratchet 24 is cleared. This brings beaks 15 up to rest on sector 17, as shown in Fig. 8. This breaks contact 19 on the local clutch magnet circuit. Contact 13 is broken by the de-energization of the clutch magnets, which breaks the line circuit.

Shaft 7 on which the slideable members of the clutches are mounted is driven by a motor 35, with a pulley 36, belt 37 and pulley 38 on shaft 7.

Shafts 2 and 7 are fixed in standards 39 which extend from the floor 40 to rear wall 41.

Disc 1 bears a commutator peripherally, with side annular rings 43, 44, connected to alternating segments as 45—46, as seen in Figs. 4, 5 and 6. Insulation 47 is placed between the segments of the commutator. Brush 42 rests on the periphery and the segments pass under it, while brushes 49, 50 contact with annular rings 43, 44, thus supplying current of opposite phase, and brush 48 thus passing alternating current to line of a frequency depending on the width of the segments and speed of disc 1.

The keyboard with keys as 51, in twelve rows, is provided. The rows are as follows:

1. Name of theatre, as Broadhurst;
2. Price of ticket, as $4.40;
3. Year of sale, as 1929;
4. Day of month, as 21;
5. Month of year, as March;
6. Day of week and time of day, as Thursday evening;
7. Number of seat in row, as 101;
8. An alternative number, as 24;
9. Letter of row as HH;
10. An alternative letter, as H;
11. Side of theatre, as Right;
12. Floor, as Orchestra.

The rows of keys number from left to right. The illustration shows thirty six keys in a row. This only applies to rows of seat numbers. Other rows have a fewer number or a greater number of keys as required, although where a greater number is required it is better to have alternative rows as in the case of H and HH. In Fig. 8 rows HH and H are shown, while the short row in which the keys are marked R, L, C, 1, 2, 3, 4, 5, 6 and 7 indicate locations, right, left, center and sections 1 to 7.

In rows A and AA a key will be noticed at the top marked SK. This stands for "skip," and causes the disc to stop at the first segment of the commutator and transfer the functioning to the next disc. The reason for this is that no ticket could be for more than one row, and when the ticket is printed the space of the row skipped is left blank. The number of seats in the row is also provided with a skip key. Where the number of theatres is greater than can be contained on one printing wheel, a second will be supplied with skip keys for keys for the two rows of theatre keys.

The keys, as 51, are mounted on plungers as 52, with notch 53, peg stop 54 and spring 55, as detailed in Figs. 2 and 3. The section of the key at the end is a flat rectangle.

The keys are journalled in three walls, the front or face wall 56, the working wall 57, parallel to the face wall and the rear wall, 58, a cylindrical wall curved about the periphery of the discs for about 145 degrees. One key of each row except the skip rows, in which case the skip key is used, is pushed in. They are automatically caught and held in.

Disc 1 carries stud 59. When disc 1 rotates counter clockwise, as seen in Fig. 1, stud 59 will presently encounter the key heel which has been pushed in. Meanwhile in rotating a number of alternating impulses are sent to line. If the top key is presented only one impulse goes to line, if the bottom key, thirty six impulses or eighteen alternations. When the disc is stopped a prolongation of the final impulse goes to line, which functions to cut out the disc and set the next disc in operation.

The prolonged impulse throws the clutch out of engagement, when spiral spring 3, which has been slightly wound up during the rotation of the disc throws the disc back to its initial position, stud 60 of disc 1 striking standard 61, which supports wall 58.

Motor 35 is started by manually closing switch 62, and switch 63 throws in the main line. When the motor is running and the line is thrown in spur gear 6 drives gear 4, but disc 1 is prevented from rotating by mechanical stop 64 engaging lug 65 on disc 1. Switch 63 closes the line indirectly through closing a local battery circuit which energizes clutch magnet 9 throwing clutch into engagement and closing main line. Stop 64 has springs 66 and flange 67. The spring draws it inward. When pulled out manually it releases disc 1. Stop 64 and lug 65 are bevelled so that when spring 3 drives disc 1 back, stop 64 again engages lug 65 automatically.

Supplementary stops for all the discs are shown at the bottom of Fig. 1. Stop arm 64a is pressed against stop 60 by spring 65a. It is pivoted in lugs on the floor and is fixed to spindle 66a, which is turned by a crank manually depressing 64a below stop 60 and allowing discs to turn.

Figure 9:
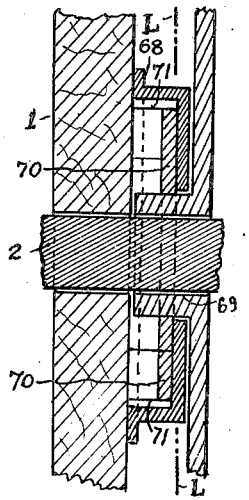
Fig. 9 is a section of the friction drum of the commutator disc, on line K of Fig. 10.
Figure 10:
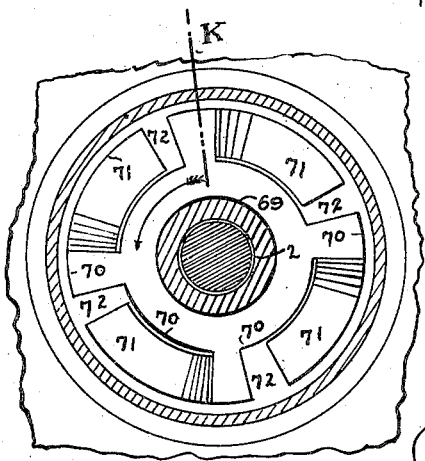
Fig. 10 is a side elevation of the same, partly in section on line L of Fig. 9.

Friction drum 5 is illustrated in detail in Figs. 9 and 10. Cup 68 is fixed to disc 1. Disc 1 rotates freely on shaft 2. Gear 4, which has a boss hub 69, rotates freely on shaft 2. Affixed to boss 69 is disc 70, which rubs the inner face of cup 68. Disc 70 has four wings as 71, cut through and bent down. The lower ends rest on the face of disc 1; the portions marked 72 in Fig. 10. The wings are of springy material and force faces 69 and 70 together. While gear 4 rotates and disc 1 is free to rotate, the pressure of wings 71 is sufficient to carry disc 1 along, but if disc 1 is stopped, wings 71 continue to rotate along with boss 69 and gear 4, and rub over the face of disc 1, starting it instantly it is released. As there is only a small load on disc 1, wings 71 need press only lightly on disc 1.

In order to hold the keys in the operative position when they are depressed and to release them singly or in totality simultaneously, means are provided as shown in detail in Figs. 2 and 3. The lower part of Fig. 2 is an elevation of the face wall 56 and two keys with a wing thumb piece.

The upper part of the figure is a section with the face wall removed. Key plungers 73, 74 are in idle position. Key plunger 75 has been depressed to the operative position. Latch levers 76, 77, 78 are provided, pivoted on stud screws 79, 80, 81. Mounted on stud screws also are leaf springs 82, 83 and 84 which force the latch levers against the sides of the key plungers. When the key plunger is depressed, its notch 53 is engaged by the latch lever, and its end, as 85, is held in the path of stud 59 of disc 1, and brings disc 1 to a stop when stud 59 reaches end 85. In order to return a single key, as 86, to idle position, wing thumb piece as 87 is provided. Through axis stud it is affixed to a latch lever and may be manually operated in opposition to latch lever spring to lift latch lever out of notch in plunger and allow spring 55 to return plunger to the idle position.

Sliding in guides as 87 on the inside of the face wall 56, are a set of combs as 88, terminating at the bottom each in a bar as 89, sliding in slots in walls 56, 57, the outer end of which, 90, serves as a key for the manual depression of the whole comb, in opposition to spring 91 which normally holds the combs in the upper position. The comb 88 has teeth as 92, 93, 94 which engage the ends of levers as 79, 80, 81. When lever 78 falls into notch 53, tooth 94 stops lever end 81 and the depression of key 90 will clear the key similarly as would the operation of thumb piece 87.

In order to clear all the keys at once, a universal depressing bar 95 extends across the apparatus and bears on the inner ends of bars 89. Universal bar 95 is hinged by arm 96 to a pivot in lugs 99. Three of these are sufficient, one at either end and one in the middle. Cam shaft 100 extends across the apparatus and has cams 101 and handle crank 102. When 102 is rotated manually cams 101 strike arms 98 and depress the universal bar, carrying down all the combs and freeing all the keys. Distance piece 103 extends from base 61 of wall 58 to wall 57 at the bottom. The walls are attached at the top to top plate 104 of the framework.

It is desirable to cancel at the theatre the ticket, duplicate of which is being printed at the outlying station. For this purpose slot 105 in the side wall 106 of framework 12 is provided. The ticket is thrust in endwise, guides 107 controlling its direction. It comes in contact with end 108 of lever 109 pivoted in lugs 110. End 108 is held down by spring 112. When end of ticket lifts 108 up electrical contacts at the other end, 113—114 are made, being in series with switch 63 which would not close its circuit unless 113—114 was also closed. It is thus necessary to introduce a ticket to start the apparatus.

In order to deface the ticket, punch 115 on the end of lever 116, pivoted in lugs 117, is opposite a hole in the base plate 111, and it is driven down through the ticket. Cam 118 on shaft 100 drives lever 116 down when shaft 100 is rotated manually to clear the keyboard. Shaft 100 is journalled in side 106 of framework, and in lug 119 near side 120 of framework 12.

The diagram, Fig. 23, shows the electrical connections. In the diagram the first unit at the right has been operated, the second unit is in operation and the two units to the left are awaiting operation. Only four units are indicated but as many more as may be desired may be inserted, preferably between units two and three. The diagram, generally speaking, is viewing the apparatus from the rear, looking towards inside of keyboard. The operations begin on the right of the figure and work towards the left.

To operate the apparatus the following steps are taken. A ticket is inserted in slot 105, thus closing contacts 113—114. The motor 35 is turned on by switch 62. Shaft 7 now begins to rotate idly. All the clutches 8 are open. The operator closes switch 63. This completes local circuit $Aa1$. It comprises local battery or other source of direct current, 122, magnet A9 and contact 123 at armature of magnet $Aa20$. The initial position is best seen at $Bb20$, as $Aa20$ as shown has already functioned. The completion of circuit $Aa1$ energizes clutch magnet A9 and this attracts armature A10. The initial position is best seen at C10 and the completed position at B10. The drawing down of armature A10 completes main line circuit A2, but it cannot yet send impulses to line as disc A1 has not started to rotate. Contact 124 completes the line circuit. The depression of A10 causes clutch A8 to engage, as best seen at B8. Spur gear A6 rotates and drives gear A4, but as disc A1 is held by stop 64—65 it cannot rotate. Take-off brush 48 rests on insulation at the initial point.

Line circuit A2 starts at line batteries A125 and A126 with their opposite poles to earth, connected by brushes 49, 50 to commutator annular rings of disc 1, thus supplying current of opposite sign as the disc rotates. Lead A goes to contact 124 where it is completed by armature A10. It then goes to magnet $Aa20$ and from thence to line.

At this point the apparatus is in readiness for operation, the line being earthed at the outlying station. The functioning begins when stop 64 is manually released. Disc A1 begins to rotate and sends alternating impulses to line which operate the outlying printer's initial typewheel. When disc 1 is stopped by stud 59 striking a key heel set for that purpose, a prolongation of the last impulse is sent to line.

Magnet $Aa20$ is so wound that the alternating impulses do not affect it, but when the impulse is prolonged the magnet functions, and draws down its armature $Aa20$. This armature is caught by ratchet $Aa24$, and remains in that position until cleared manually at the close of the operation, by crank 32. The depression of armature $Aa22$ breaks contact 123 and opens circuit $Aa1$ permanently. This de-energizes magnet A9 which permits clutch A8 to be disengaged and breaks contact 124. Thus the line goes dead by automatic action on the functioning of the prolonged impulse. Clutch A8 being disengaged, spring 3 returns disc A1 to its initial position. The commutator of the periphery cannot send any impulses to line on the retraction of disc 1 as the line is broken at 124. There is accordingly a dead space on the line momentarily.

When armature A10 is released it allows arm 18 of bell crank 19 to pass to the left as seen in Fig. 11. This causes the fan part of sector 17 to be pushed to the right, and allows crowbeak 15 to fall to table 16, and thus close contact 19. The sector is not illustrated in the diagram, but crowbeak 15 and arm 14 are indicated in the lowered position making contact A19.

The closing of A19 completes local circuit Bb1, which passes through direct current battery 127, contact B128 and clutch magnet B9. It energizes B9 and causes contact 129 to be made, setting up the main line circuit B2, which derives current from batteries B125, B126. This circuit passes on through brush B48, lead B to contact 129, magnet Bb20 and thence to line. The line remains dead as disc B1 does not rotate until clutch B8 engages, which is momentarily after the making of contact 129. Upon disc B1 rotating, alternating impulses pass to line until the disc is stopped by a key heel, when a prolonged impulse results. In the illustration of the figure 23 the unit B is in operation and unit A has ceased to function. When the discs are stopped by the key heels the friction drum 5 between disc 1 and gear 4 permits shaft 7 and spur gear 6 to continue to rotate gear 4 while disc 1 is held at rest.

When disc B1 is stopped by a key heel, a prolonged impulse goes to line, which energizes magnet Bb20, and attracts armature Bb22, breaking contact B128, while Bb22 is locked up by ratchet Bb24. This breaks circuit Bb1 which de-energizes magnet B9, and frees B10, which then takes the position shown in the diagram by A10, breaks contact 129, which makes the line dead, and disengages clutch B8. The fall of crowbeak B15 makes the contact B19 and sets up the local circuit Cc1.

Local circuit Cc1 includes contact B19, local direct current battery C130, magnet C9 and contact C131. It energizes C9 and completes line circuit C2 through contact 132. Brush C48 draws alternating impulses from batteries C125, C126 which proceed through lead C, contact 132 and magnet Cc20, and thence to line. The subsequent closing of clutch C8 starts disc C1 which sends the alternating impulses. When a key heel stops disc C1, the prolonged impulse energizes magnet Cc20, breaks contact C131, armature Cc22 being locked up by catch Cc24. When local circuit Cc1 is broken by C131, magnet C9 de-energizes, line circuit C2 is broken at 132 and local circuit Dd1 is made by the fall of crowbeak C15 making contact C19. Clutch C8 is disengaged.

Local circuit Dd1 includes contact C19, direct current battery 133, magnet D9 and contact D134. This energizes magnet D9 and sets up main line circuit D2 by making contact 135. Circuit D2 starts at batteries D125, D126, thence through brushes of disc D1 to lead D, contact 135, magnet Dd20 and thence to line. The closing of clutch D8 starts disc D1 and sends alternating impulses to line. The prolongation of the last impulse energizes magnet Dd20. Contact D134 is broken, and armature Dd22 is locked up by catch D24. This de-energizes magnet D9, breaks contact 135 and makes line D2 dead. This completes the cycle of functions, as crow beak D15 has no function to perform in de-energizing a further local circuit.

The operator now prepares the apparatus for a new cycle by opening switches 62 and 63. Crank 32 is turned which clears the ratchets of the line magnets and prepares contacts for the local circuits, returning the parts to the positions indicated at C9, C10 and Bb20.

The operator then rotates crank 102 which clears the keys and defaces the ticket at 105, which is then withdrawn.

In case a ticket such as HH24 has been printed and the next ticket is to be the adjoining one at HH26, the operator does not clear the keys at HH26, the operator does not clear the keys with crank 102, but clears key 24 with thumb piece 87, and sets key 26. He leaves ticket HH24 in slot and causes the machine to operate as before. At the conclusion he defaces ticket HH24, removes it and inserts ticket HH26 and defaces it by a turn of the crank 102, which only moves cams 88 idly as they have already released the keys.

The line 136 is superimposed on telephone line 138 by apparatus 139, well known in the art. Telephone 137 enables the operator to converse with the printer operator to ascertain what tickets are wanted, and to have the printer setting read back to him before printing to avoid mistakes.

The apparatus thus functions to send selected groups of signals to line, each group comprising a selected number of alternating impulses and a prolonged impulse at the end and a dead space. These impulses and spaces are used to operate the printer at the outlying station.

The printer is illustrated in Figs. 14 to 22 inclusive.

The printing machine consists of a series of typewheels with type on their peripheries corresponding to the keys of the sending machine, and means for setting such typewheels successively, and for printing the ticket by manual operation.

The typewheels are caused to rotate by gears, driven by a motor through intermediate gears as later described. Typewheel 201 contains the names of the various theatres arranged parallel to the axis. To it is affixed gear 202 of considerably smaller diameter. Next comes a partition, supported by the base, but bearing a fixed type, 11, which indicates the number of the outlying station. As once a printer is installed it remains at its station, so this number does not need to be succeeded by any other. It appears on all tickets. Other stations, of course, have difference numbers on this partition. Another partition, 204, is marked with the initials E. P., T. P., To., and A. O. These stand for the words Established price, Tax paid, Total price and Admit one. This reading matter is the same for all tickets, and this portion is, accordingly, permanently fixed.

Typewheel 205 is marked 4 —, .40 and 4.40. These figures stand for $4.40, $0.40 and $4.40, coming opposite the words Established price, Tax paid and Total price of the partition 204, respectively. Where the price is $3.00 or less and no tax is paid, the figures opposite Tax paid are omitted. Attached to typewheel 205 is gear 206.

Typewheel 207 bears the year date, as 1929. To this is attached gear 208. The year date is used because of changes at the end of the year, and because a dozen years or more may be placed on it to avoid frequent changes of this wheel.

Typewheel 209 bears the days of the month from 1 to 31. Attached to it is gear 210. These wheels and the following have their letters at right angles to the date.

Typewheel 211 bears the names of the months of the year. Attached to it is gear 212.

Partition 213 is permanently supported by the base. The letters HH on it stand for the name of the apparatus and appear on every ticket. The remaining portion of the ticket from this point on is the coupon to be torn off at the theatre door and retained by the patron. It bears duplicates of price and dates, and has additional data.

The typewheels bearing duplicate matter are driven by the same shaft that drives the original, and thus do not require additional sets of keys on the sender.

Typewheel 214 again bears the year date, 1929. To it is attached gear 215.

Typewheel 216 bears the day of the month again, and attached to it is gear 217.

Typewheel 218 bears the month again, and attached to it is gear 219.

Typewheel 220 contains the days of the week, not used before, and also distinguishes between matinees and evenings. Attached to it is gear 221.

Typewheel 222 bears the figures 10. This is a number corresponding to the name of the theatre as on typewheel 201. Thus the identification of the theatre is made on the coupon after it is detached, data which need to be familiar only to the employees of the theatre. Gear 223 is attached to typewheel 222.

Typewheel 224 bears the prices, as $4.40, indicating the total price. It is operated in conjunction with typewheel 205. Gear 225 is attached to typewheel 224.

Typewheel 226 bears the number 101, indicating a seat number. On this wheel are numbers from 101 to 135, usually center section numbers in a theatre. Attached to typewheel 226 is gear 227.

Typewheel 228 bears figures 21. This is also one of a set of seat numbers, ranging from 1 to 35, usually side section numbers. In printing a ticket either typewheel 226 or 228 is used but not both, the unused one being skipped by the skip key. Gear 229 is attached to typewheel 228.

Typewheel 230 carries letters, HH. This is a row designation, which rows run from AA to ZZ. Gear 231 is attached to typewheel 230.

Typewheel 232 shows letter H. This is a row designation, which rows run from A to Z. In use either 230 or 232 is used but not both. The one not used is skipped. For these skipped wheels, the periphery at the initial point bears no type, and leaves a blank space on the ticket.

Gear 233 is attached to typewheel 232.

Typewheel 234 shows word Right. This is a location by sections or aisles. Gear 235 is attached to typewheel 234.

Typewheel 236 bears the designation Orch, being a floor designation, as orchestra, balcony, etc. Attached is gear 237.

The gear and typewheel units are mounted to rotate freely on fixed shaft 238, set in standards 239, 240 in the base.

Mounted to rotate freely on shaft 241, fixed in standards 242—243 are seventeen gears as 244, to engage gears 202, 206, 208, 210, 212, 215, 217, 219, 221, 223, 225, 227, 229, 231, 233, 235 and 237. These gears all engage gears 244 which in turn are engaged by gears of equal number mounted to rotate freely on fixed shaft 245, mounted in standards 246, 247, which standards also serve to journal rotating shaft 248, with grooved pulley wheel 249 and pulley cord 250.

Script wheels, partitions and gears 251 to 287 inclusive correspond to typewheels, partitions and gears 201 to 237 inclusive. The script wheels and partitions are similar in size to the type wheels and partitions, and bear in readable script the same symbols as are borne by the typewheels and their partitions reversed to print from. The symbols on the script wheels and their partitions are visible through a window in the top of the cover, indicated by dotted lines 288 in Fig. 14, being above the plane of the paper of this sectional plan.

The gears affixed to the script wheels, the intermediate gears 244, and the gears affixed to the type wheels are all of the same size. Thus through window 288 may be read the data which will be on the ticket when printed. If any mistake is made by the operator of the sending machine, it becomes obvious to the operator of the printer before printing, and the printer may be cleared and the error corrected before printing.

Beneath the script wheels are seventeen pairs of gears, as 289, somewhat larger than the script wheel gears, but not necessarily so. They are attached to the shaft by friction drums 461 as seen in Figs. 21 and 22 in details.

Shaft 248 is driven by pulley 249, cord 250 and pulley 290 on shaft of motor 291. Motor 291 runs continuously during operation. It is turned on by switch handle 292 closing switch contacts at 293 when the machine is to be operated, and is turned off manually afterwards.

Gears 289 would rotate script and typewheels continuously if not prevented, but when a typewheel and script wheel are stopped, shaft 248 continues to rotate, and will drive any of the wheels immediately they are released, through the friction drums 461.

In order to stop the typewheels at the proper locations so that the selected ticket may be reproduced, a set of twelve escapement units are provided, six on one side and six on the other.

A detailed side elevation of the escapement unit is shown in Fig. 15. There are twelve units, one for each row of sender keys. Some of them control two typewheels that are duplicates, as the date and price on ticket and coupon. Twelve shafts are controlled by the escapement units, six at one end and six at the other, in six lines, two units being at the outer ends of a pair of shafts in line.

Escapement shafts 294, 295, 296, 297, 298, and 299 at the front or lower end of Fig. 14 are respectively in line with shafts 300, 301, 302, 303, 304 and 305 at the rear end.

The escapement shafts 294 to 305 inclusive have gears affixed to them, driven by the gears of the typewheels and of the same size. When the escapement shafts are stopped the typewheels and script wheels are also stopped.

Shaft 294 has gears 294G, which controls typewheel 226, bearing seat numbers, as 101. This is effected through gear 227 which engages gear 294G.

Shaft 300 is in line with shaft 294, and has gear 300G, controlling typewheel 236, indicating floors, as Orch. This control is effected through gear 237 on typewheel 236. Shaft 300 is journelled in standard 300W and 300W2, which are attached to the side wall but are broken off in the drawings, as they attach above the plane of the paper. Shaft 294 is similarly journalled but standard 294W is omitted from the drawings.

Escapement shaft 295 carries gears 295G and 295G2. Gear 295G controls typewheel 211 (March) through gear 212 on the main part of the ticket and gear 295G2 controls typewheel 218 (March) through gear 219, on the coupon part of the ticket.

Shaft 301 is in line with shaft 295. Shaft 301 carries gear 301G which controls typewheel 230 (HH) through gear 231. Shaft 301 is journalled in standards 301W and 301W2, which go to the side wall. Shaft 295 is similarly journalled.

Shaft 296 has gears 296G and 296G2. Gear 296G controls typewheel 205 ($4.40) through gear 206 on the main or admission portion of the ticket, while 296G2 controls typewheel 224, ($4.40) through gear 225 on the coupon part of the ticket.

Shaft 302 is in line with shaft 296. It has gear 302G which controls typewheel 234 (Right) through gear 235. Shaft 302 is journalled in standards 302B and 302B2, the latter not shown, which extend to the floor. Shaft 296 is similarly journalled.

All the remaining escapement shafts are journalled in standards which extend to the base or floor of the machine, and which are bent and off set to reach the floor without interfering with other members. These standards are mostly broken away in the drawings for the sake of clearness.

Shaft 297 controls two typewheels bearing the day of the month, and shaft 303 in line with it controls seat number typewheel 224 (Seat number 21.)

Shaft 298 controls two typewheels bearing the year, (1929) and shaft 306 in line with it controls typewheel 220, (Thursday evening.)

Shaft 229 controls typewheel 201 (theatre) and typewheel 226 (10, number of theatre), and shaft 305, in line with it, controls typewheel 232 (row letter H.)

These seventeen forms of changeable data are thus controlled by twelve escapement units and shafts.

The escapement units are similar although placed at different angular attitudes as regards shaft 238.

As seen in Fig. 15, framework of unit 307 is attached to standard 308 which may be affixed to wall or base.

Frame 308 carries magnet 309, positioned perpendicularly and magnet 310, positioned horizontally. Escapement arm 311 is pivoted in frame 312, and has cross bar stop end 313.

A pair of escapement wheels are provided, affixed to escapement shaft as 295. They are provided with teeth. The teeth of one wheel are staggered with respect to the other by the amplitude of half the pitch of a tooth. When the arm 311 moves back and forth from one to the other, the teeth being driven towards the bar stop end 313, the shaft rotates by an angle equal to half the pitch of a tooth at each movement, or a whole tooth on a stroke back and forth. Magnet 310 is a polarized magnet and so arranged that when the arm 311 is drawn to one side it remains there until drawn to the other side by alternations of current received from line.

Thus the alternating impulses from the sender allow the escapement shafts to advance the printing wheels to the selected printing point.

On the prolonged impulse the arm 311 remains where it was drawn. When the time for clearing the escapement wheels comes, local current is applied to magnet 309, it being direct current. Magnet 309 being energized, stop 313 is lifted with arm 311 from whatever tooth it happens to be in, and the escapement shaft rotates, in a counterclockwise direction as seen in Fig. 15. Arm 311 is pivoted in frame 312 which in turn is pivoted in standards 316—317 on spindle 318, while end 319 of arm 311 carries armature 320. Magnet 309 attracts this and thus lifts arm 311. Magnet 309 overcomes spring 321 which ordinarily holds arm 311 on the escapement wheels.

In order to stop all the escapement wheels at the initial point, irrespective of how many teeth have escaped, a contact breaker composed of spring leaves 322—323 is provided. The circuit of magnet 309 is in series through this breaker.

Cam 324 is fixed to shaft 295. As it rotates after the shaft is freed by the lifting of lever arm 311, it presses down contact leaf spring 323. A space free of teeth is provided on the escapement wheels, beginning at point 325 and extending to high tooth 326. On the type and script wheels a similar blank space is provided, no letters appearing on that space.

Leaf spring 323 and spring 322 and cam 324 are so adjusted that contact at point 327 is broken just after point 325 on wheel 314 has passed stop 313. The de-energization of magnet 309 thereupon, allows spring 321 to retract arm 311 and stop 313 strikes the toothless portion between 325 and 326. When high tooth 326 strikes stop 313 the shaft stops. Similarly all the shafts are thus stopped at the initial point of the high tooth. The high tooth is provided in case arm 311 does not descend quickly enough. The wheel 314 must then stop at the initial tooth whether the magnet has released arm 311 in time or not. Cam 324 serves an additional purpose in that it dampens the momentum of the shaft towards the end of the rotation, so that the shaft is rotating much more slowly when point 325 is reached than it was earlier. Cam 324 slips off the end of leaf spring 323 at the moment arm 311 and stop 313 strike high tooth 326. Thus it is in working position even on the first impulse of the alternating current. The breaking of contacts 327 breaks other contacts automatically so that the remaking of 327 does not at that time cause 309 to be energized again. The alternating impulses from the sending having caused the first escapement unit to function are automatically switched on to the next unit so that the series of typewheels are positioned one after the other. The symbols are read through window 288, and if correct the ticket is then printed.

To accomplish the automatic succession of one escapement unit after the other, a series of twelve contact make and break magnets are provided, as 328. Also a set of twelve units of ratchet magnets, 329—330 and a thirteenth unit of the same.

Magnet 328, a plan of which is seen in Fig. 14, a side elevation in Fig. 6 and an end elevation in Fig. 18, is comprised of base plate 331 affixed to floor 332 of the machine. Riser 333 supports magnet 334, and pillar 335 serves as a pivot for a double pendant arm, 336—337 working as a unit. One arm makes contacts 339, 340, 341 and the other the two contacts 342, 343 when the armature is drawn in, breaking the contacts 339, 340, 341. When the magnet is energized the catch 344 locks the armature in that position, until it is cleared later by a manual operation. This is accomplished by means of crank 345, affixed to shaft 346 journalled in side 347 of the main frame and standard 348 at the other end mounted on base 332. Fixed on shaft 346 are cams 349, one for each catch 344. When the crank is rotated these cams depress catches 344, which are pivoted in lugs 350. This frees the bottom end of 336 and it is drawn back to its initial position by spring 352, breaking contacts 342, 343 and remaking contacts 339, 340, 341. This re-setting or clearing takes place after the function is complete in order to clear the machine for a new operation.

Operated in conjunction with units 328 are units 329—330, the electrical connections of which will be described later. When magnet 353 of unit 329 is energized it attracts armature lever 354, mounted on lugs 355 set in side wall 373, and restrained by spring 356, which is overcome by the magnet's action. When the armature is attracted an electrical contact is made from the armature through leaf contact 357. This energizes magnet 358 of unit 330, which has as an armature a bell crank lever 359, pivoted at 360. Pegs 361, 362 limit the movement of armatures 354, 359.

When contact 357 is made, magnet 358 attracts the armature, overcoming spring 363. This throws catch 364 against the end of armature 354, which remains locked up, even after 353 is de-energized, until the circuit of magnet 358 is broken at another point, which unlocks armature 354 and breaks contact 357.

A contact block 364 on armature 354, but electrically isolated from its serves to close an electric circuit through leaf springs 365, 366 when the magnet of armature 354 is de-energized. The contact is ordinarily made as armature 354 normally rests against peg 361.

There are thirteen of these units 329—330 in the apparatus, twelve in connection with the automatic transferring of alternating current from one escapement unit to the next, and one used in connection with escapement arm clearance.

The apparatus is started by turning on the motor by motor switch 292, the units 328 having first been cleared by the manual operation of crank 345. When the motor is started the friction drums 461 tend to rotate the script wheels and typewheels.

The high tooth, 326, however, prevents. The sending operator is in telephonic communication with the printer operator and when the sending operator announces that his machine is set and ready to transmit, the printer operator closes line switch lever 367 against spring 368, lever 367 being pivoted in side wall 369. In the normal or open position of the switch lever it connects line to earth. When the switch 367 is closed, this contact is momentarily broken; the line is connected to the apparatus and earth is reached after passing through the apparatus.

When lever 367 is in the dotted line position 370 seen in Fig. 14, it connects line to apparatus. When closed, lever 367 is locked by bell crank lever catch 371 in opposition to spring 372, and cannot be manually released. When magnet 373 is energized by a local circuit, which happens only after the whole apparatus is set for printing, the lever 367 is released. When necessary in case of an emergency lever 367 may be tilted out of the plane of the paper and may thus be freed from 371. If this occurs during operation it leaves some of the magnets locked up. They may be cleared as described later.

The thirteenth set 329, 330 does not employ the contacts 364, 365, 366. The thirteen sets are arranged on the wall 373, but if desired may be placed under the gears 244. Platform 374 is attached to wall 369 and carries contacts 375, cutting the machine out of line, contacts 376 cutting it in line, and magnet 373, pivot 377 and bell crank 371.

An emergency switch 378 closes contact 379 to clear the escapement arms 311, as described later.

When all the typewheels have been set the printing function is carried out. A printing arm 380 is seen in side elevation in Fig. 6, section in Fig. 17, partly in front elevation in Fig. 18 and indicated in plan by dotted lines in Fig. 14, being above the plane of the paper. This arm is affixed to two plunger rods 381, 382. The printing arm is of H shape, one staff of the H, 393, extending over the type, and the cross bar of the H reaching to the portion connected with the plunger rods. Bar 383 is hinged at 384 so that it can swing up on arc indicated by dotted line 385, Fig. 17. A thumb plate 386, rotating on an axis pin 387 when turned parallel to bar 383 permits the latter to be raised. The ticket may then be inserted in grooves in the bar 383 to be printed. When the thumb plate is turned parallel to the cross bar of the H it holds the bar 383 solidly in the printing position.

Two grooves are shown in bar 383. One is for the ticket and the other for a duplicate which may be printed by the insertion of a piece of carbon paper between the two.

A masking plate, stencil or matrix 388, Fig. 20, is fitted over the ticket, the type appearing in the apertures as 389. The underside of bar 383 may also be routed out in the portions corresponding to those of the masking plate between the apertures and the edges as 390. Thus no pressure is applied to any but the printing surfaces, and the rest of the ticket is not smudged.

When the printing lever is pressed down the printing is effected by an inked ribbon 391, similar to a typewriter ribbon, which is drawn across the type slightly between printings. The ribbon is in the form of an endless belt. Its upper stretch across the type is carried by rollers 392—393. It passes down from 393 to roller 394, being drawn down by pressure rollers 395—396, mounted on standards 397, 398, 399 set in the base. Roller 396 is fitted with gear 400, which is engaged by gear 401 on shaft 402. Gear 401 is stripped of teeth for half its periphery, so that the ribbon does not move during the printing stroke but moves at its conclusion, through the latter half of the rotation of shaft 402. From rollers 395—396 the ribbon proceeds under roller 394, then along the base through passage holes in the partitions and standards again to roller 395 and then up to the starting point 392.

The printing impression is effected by rotating crank 403, affixed to shaft 402 for one revolution. Shaft 402 is journalled in wall 369 and standard 399. One side of clutch 404 is affixed to shaft 402. In line with shaft 402 is shaft 405, journalled in standard 406 and wall 407. The end of 405 next to 402 carries the driven member of clutch 404. Clutch 404 normally stands engaged, through clutch lever 408, pivoted in standards 409, 410 in the base, being drawn closed by spring 411 extending from pedestal 412 on journal standard 406 to lever 408.

Shaft 405 has affixed to it mitre gear 413 which engages mitre gear 414 on shaft 415, journalled in standards 416, 417, 418 in the base. Shafts 405 and 415 rotate in the ratio of one to one, shaft 405 being the driving member. Shaft 415 carries affixed to it cams 419—420. Plunger rods 381, 382 carry arms 429, 430. When cams 419, 420 are rotated by crank 403 through shafts 402, 405 and 415, they press on arms 429, 430 and draw down bar 330 and make the printing impression. This occurs at the end of the first half revolution of crank 403. The latter half revolution allows the plunger arms to rise and causes the progress of the ribbon to take place. Thumb plate 386 is then turned, 383 lifted and the ticket removed.

In order to prevent backward rotation, shaft 402 is fitted with a ratchet wheel 431 and pawl 432 and shaft 405 is fitted with ratchet wheel 434.

In order to prevent crank 403 from rotating more than once at a time, cam 435 is fixed to it, inside of wall 369. In Fig. 18 the cam crank 403 is indicated in dotted lines, and a chain dotted circle indicates its radius of action. The surface of cam 435 retreats to shoulder 436. Magnet 437 has armature lever stop peg 438 and armature lever 439, retracted by spring 440. The stop end 441 of lever 439 fits under the shoulder 436 and rests on the top of pillar 442, and has shoulder stop 443. In the view of Fig. 14 end 441 is preventing the further rotation of crank 403, having followed the cam surface in under the shoulder in the previous rotation, drawn in by spring 440. Crank 403 cannot be turned backward at any time on account of pawl 432 of ratchet 431. It thus remains locked up until all of the typewheels are set, when magnet 437 is caused to function, drawing stop 441 from under shoulder 436. Catch 444 is mounted on pivot 445 and has arm 446 which is drawn upward by spring 447, limited by stop arm 448 and peg 449. When end 441 of lever 439 approaches wall 373, its stop 443 clears catch 444 which then rises so that 443 cannot return when the magnet 436 is de-energized. Once drawn towards wall 373 end 441 clears shoulder 436 and cannot impede it again until peg 450 on the periphery of cam 435 is caused to strike beam 446² of catch 444 and depress it. This depression forces catch 444 down below stop catch 443 of end 441, and it retracts, drawn by spring 440, as magnet 437 has in the meanwhile been de-energized.

This does not occur until crank 403 is partly rotated, that being made possible by its being unlocked by the withdrawal of end 441. As the cam is rotated end 441 follows it and again is under shoulder 436 at the end of the rotation. This arrangement prevents crank 403 from being rotated prematurely, it being automatically locked after one revolution until time for another printing to take place.

Shaft 402 carries three commutators, 451, 452, 453, with brushes for closing contacts 454, 455, 456, at certain angles on the rotation of crank 403, as later described.

The top cover is in contours, going under type printing bar 380 at 457, over the escapement wheels of shaft 294 at 458 and rising in housings at 459, 460. At 464 the top contains the window 288 for viewing the script wheels.

Fig. 21 is a section of friction drum 461, which enables shaft 248 to drive the gears 289.

Fig. 22 is a plan of the spring leaf portion of 462. Drum 461 is affixed to gear 289. Spring disc 462 is affixed to shaft 248 by tongue and groove engagement, the tongues on 462. Spring disc 462 thus rotates with shaft 248 at all times. It has four wings as 463 turned down. The bottoms of the wings rest on gear 289 and the top of the wing disc table on the inside of the drum 461. The pressure of the spring wings is sufficient to carry gear 289 along unless it is stopped; when the wings rub over the surface of gear 289, ready to start it again when the obstruction is removed. One motor thus supplies friction drive for the seventeen gears 289.

Figure 24 is a diagram of electrical connections for the printer.

At 139 the printer current is superimposed on the telephone wire 138—140 at the sending end. At the receiving end of the line at 141 the printer current is deposed from the telephone line by apparatus 142 well known in the art.

Telephone line 500 leads to ear phones 501 and earth 502.

Line 503 goes to magnet 334 and from there to the contact 376, made by manual operation of starting lever 367. When lever 367 makes contact at 377, the line being earthed through lead 504 and earth contact 505.

Four units as shown, E, F, G and H, corresponding to units A, B, C and D of the sender. Any number of units may be used, preferably inserted between units F and G. In the drawings unit E is shown as having operated, unit F about to be operated and units G and H awaiting operation.

Arm 506 of bell crank lever 336 carries two contact plates on the under side and a connection to ground. On the upper side of 337, a twin of 336, is a contact plate which makes two contacts. On the underside are contact springs 339, 340 and 341, and on the upper side contact springs 342, 343.

When arm 506 is in the position shown in unit F, circuit E1 exists, made up of line 503, magnet 334E, contact 376, brushes 339—340 through contact block 507 on under side of 506, lead 508L, to magnet 310E, return lead to magnet 353E, lead 509 to contact spring 341, block 508 and lead 510 back to ground 504—505. If the line circuit is not strong enough, relays may be inserted at points 511 or 512 or in lead 503.

When the alternating impulses arrive they do not affect magnets 334E and 353E, but do operate the polarized magnet 310E, pulling armature arm 311 back and forth and permitting 314 and 315 to escape tooth by tooth until the selected position is reached. When the prolonged impulse occurs, on either phase, magnets 353E and 334E are energized and function. Magnet 353E responds first. It completes circuit E2 as follows: Line 503, magnet 334E, contact 376, lead 513, arm 354, contact 357, lead 514, magnet 358E, lead 515, lead 510 and to earth 504—505. When armature 354 of magnet 353E is locked up by bell crank armature catch 360 of magnet 358E, contact 357 is made and continues closed while circuit E2 exists, energizing magnet 358E, which retains 354 locked up after 353E is de-energized, and until 358E is de-energized.

When armature 354 is locked up, contact block 364 attached to armature 354 but electrically isolated therefrom, breaks contacts 365, 366.

Slightly subsequent to the action of magnet 358E, magnet 334E, energized at the same time, attracts armature 336 which is locked up by catch 344. This causes arm 504 to rise breaking contacts 339, 340, 341, which breaks circuit E1. This leaves arm 311 of magnet 310E in the last position to which it was drawn, and not subject to further change, holding its typewheel ready in the selected printing position.

The circuit of E1 which energized magnet 334E is broken but magnet 334E remains energized through the new parallel circuit through it of E2. The breaking of contact at 364 prevents lead 516 from passing the prolonged impulse of the line current to 334F, which would otherwise take place through contacts 365, 364, 366 and line 517.

Coincidentally with the action of magnet 334E and magnet 353E, local magnet A20 of the sender functions, breaking local circuit Aa1, and de-energizing clutch magnet A9. A10 now breaks the line at contact 124. The apparatus is so adjusted that magnet 353E locks up armature 354, magnet 334E locks up 336, and magnet Aa20 locks up Aa22 in close succession in the order named. These magnets thus have time to function before the line is broken at 124. When the line is thus broken magnet 353E is de-energized. This unlocks 354 and makes contact between 364, 365, 366. Magnet 334E is also de-energized but no function results since 366 is locked up by 344. The contact at 364, 365, 366 is made before the second disc unit of the sender begins sending alternating impulses. When B10 makes contact at 129 and sets up the main line E2 more time is taken than by the descent of 354. Line B2 is made up as follows: lead from sender, line, lead 503, lead 516, contact 342, block 509, contact 343, contact 365, block 364, contact 366 and lead 517. This circuit remains intact during the following operations, except that the line by-passes magnet 334F, through 518.

Circuit F1, through magnet 334F, is similar to circuit E1, and the whole unit functions as did E1, which is shown as having completed its functions, 334E being locked up and block 364 making line 517.

Unit G functions in a similar manner to units E and F. Unit H, however, being the terminal unit functions slightly differently, in its concluding action.

Magnet 334H is energized through lead 521, and locks up armature as before. When block 364 is dropped to contact 365, 366, lead 503H energizes magnet 437. This attracts armature 439, and draws stop 441 from under shoulder 436. 441 is then locked up by catch 444.

Printing crank 403 may now be manually retracted. As this occurs, stud 450 of cam 436 contacts with arm 446 of catch 444, and frees 441, permitting it to be drawn back against cam 435, which it follows until shoulder 436 is reached at the end of the revolution.

Meanwhile the commutators on shaft 402 have come into action. Commutator 451 has segment 523, with brushes 454. Shortly after the beginning of the printing rotation of shaft 402, 454 closes local circuit 524 with battery 525 and magnet 373, which, on being thus energized frees lever 367. Spring 368 draws lever 367 which makes contact 377. This cuts out the printing apparatus and closes the line to earth for any uses of the sending apparatus.

The rotation of crank 403 causes the printing to take place on the completion of one-half a revolution. Shortly thereafter commutator segment 526 of commutator 452 strikes brushes 455. This completes a local circuit 527, having battery 528 and leads in parallel to the polarized magnets 210. This is a direct current and draws all the arms back to the left which are on the right and holds all the arms on the left which were on the left. This positions the arms for the initial position on the next functioning of the machine. As the crank 403 continues to advance circuit 527 goes dead, the commutator segment passing to the brushes.

Next commutator segment 529 strikes brushes 456 and completes local circuit 530, with battery 531 and magnet 353X. This attracts armature and closes contact at 357X, and completes circuit 532 with battery 533, through contact 357X, magnet 353X and battery 533, and in parallel with the tilting magnets 309, and their circuit breakers. This includes contact 327 between springs 322 and 323 in series with its tilting magnet winding 309. When direct current circuit 532 is closed all the tilting magnets are in parallel and are energized. This causes all arms 311 to be tilted free of the escapement teeth. The escapement shafts are in various angular attitudes. When the escapement wheel teeth are cleared all the shafts begin to rotate. As each draws near to high tooth 326, cam 324 breaks circuit 532 as regards its particular magnet. The arm 311 descends and stops the high tooth 326. When all the cams 324 have broken all the contacts 327, circuit 532 is broken. It remains alive until the last of the contacts 327 is broken. Then it goes dead, catch 360 is released and contact 357X is broken, since magnet 353X was de-energized by the passing of segment 529 as crank 403 completes its rotation.

The clearing crank 345 is now rotated, which unlocks magnets 334E to H and the motor is turned off. When another ticket is to be printed the motor is turned on and switch 367 is turned to make contact 376.

The motor for the escapement shafts is shown at 391 with circuit 534, switch lever 535, switch 536 and power leads 537.

An emergency lever 538 with switch 539 and leads 540 is parallel with brush 456 and circuit 530 is provided for operating the tilting magnets 309 in case of emergency, as when a mistake might be discovered during setting. This would be corrected by breaking line 503—504 by switch 367, and then clearing the tilting magnets by switch 539, and rotating the clearing handle 345.

If it is desired to clear after setting and without printing, the clutch lever 408 may be drawn back and held manually while crank 403 is rotated. This is followed by turning clearing crank 345, when the machine will be in readiness for another setting.

It is to be noted in the diagrams that batteries are provided for each independent circuit. This may be obviated by sources of current in multiple if desired. Grounds are also shown for the sake of clearness, but in operation it is likely that complete metallic circuits would often be employed, all of which is within the scope and spirit of my invention.

The apparatus may be arranged for use with a separate circuit from each sending unit to each typewheel unit, with an added circuit for the final impulse. This may be accomplished with high frequency multiple channel wired wireless methods well known in the art.

Fig. 25 is a diagram of the sending apparatus when each unit has a separate channel. Device 600 superimposes upon telephone line 601 with ground 602 and ear pieces 603, the multiple high frequency channels needed.

Transmitting units J, K, L and M are provided, although a greater number may be used. To start the apparatus switch 62 is closed. This starts motor 35, fed from power leads 121. Motor 35 drives shaft 7, fitted with spur gears 6 and clutches 8. After motor 35 starts shaft 7 it will rotate idly until magnets as J9, K9, L9 and M9 are caused to function. When they are energized and cause clutches to engage spur gears, discs J1, K1, L1 and M1 cannot start, being held by mechanical stop 64a.

In order to energize the local clutch magnets, circuit 604 is formed. When ticket inserted in the machine makes contact 113—114 and switch 63 is closed, circuit 604 goes through parallel leads to the clutch magnets, they being in parallel with its battery 605.

In the illustration, Fig. 25, the clutch magnet armatures K10 and M10 are shown closed, being in operation, while J10 and L10 are open, having already functioned.

The closing of armatures 10 creates the line circuits and closes the clutches. The commutator discs will now function when stop 64 is removed.

Owing to the settings of the keys and to the fact that all the discs start simultaneously, some will be stopped before others are stopped. When the prolonged impulses occur, magnets as 20 are caused to be energized, breaking their armature contacts. This de-energizes the clutch magnets and the clutches are disengaged, the discs returning to their initial positions independently of each other.

As in this form of connections the last disc is not the one which can be depended on to send the last prolongation, means is provided to send a prolonged impulse upon the completion by the last disc of its prolonged impulse.

For this purpose magnet 606 is inserted in circuit 604. When all the contacts J125, K128, L131 and M134 are broken, the whole circuit 604 goes dead, and magnet 606 is de-energized.

Magnet 606 has armature 608, on circuit 607 which includes contact 609, battery 610, contact at lever switch 63, and magnet 611. When magnet 606 is energized, armature 608 is attracted and contact 609 cannot be made. But when magnet 606 is de-energized by the braking of the clutch magnet circuits the circuit 607 is set up.

Magnet 611 has armature 612 with ground 613. When 611 is energized it makes contact 614, which sets up the final line circuit 615, battery 616, magnet 617 and line lead 618, to device 600, arising at ground 613 and going to the printer. Contact 614 is locked up as long as magnet 617 remains energized, but when the circuit goes dead from the printer, 614 is not broken because 611 remains energized by circuit 607. It is now de-energized through switch 63 breaking circuit 607, which allows armature 612 to retract and break 614. Switch 63 is so arranged that circuit 604 is closed before 607 is closed, so that armature 608 being attracted, circuit 607 cannot be set up at the outset. Or upon the mechanical restoration of contacts, as J123, through the clearing crank 32, magnet 606 is energized and circuit 607 prevented from being set up.

Thus the de-energization of magnet 606 through the breaking of all the local clutch contacts, sends a final direct current impulse to line which effects the function at the printer which was in the previous arrangement effected by the prolongation of the final disc impulse.

When switch 63 closes circuit 604 and engages all the clutches, and mechanical stops 64 and 64a are removed, the discs begin to send impulses to line. Disc J1 starts circuit J2, by connection with batteries J125, J126 and through brush 48 to lead J and thence to contact 124, magnet Jj20 and to line at device 600.

The alternating impulses pass to line and the prolonged impulse energizes magnet Jj20, which attracts armature Jj22 and breaks contact J123 which de-energizes magnet J9. This causes contact 124 to be broken, and the clutch to be disengaged allowing disc J1 to return to its initial position.

Meanwhile all the other units have been functioning similarly, and when the last is finished, 618 circuit is completed. After the printer breaks circuit 618, switches 62 and 63 are turned off and the magnets and keys are cleared by the clearing cranks, ready for the next functioning.

When the high frequency multi-channel line reaches the printer, the channels are separated and deposed from the telephone line at 700 by device 701, by means well known in the art.

Phone line 702 leads to ear phone 703 and ground 704. Four channel leads, equal in number to the channels from the transmitting disc of the sender are provided, leading to magnets 334N, 334P, 334Q and 334R.

Circuit N1 is made up of lead Na, magnet 334N, contact made by switch arm 367X designated 376N, lead 705 to magnet 310N, operating arm 311N to set the escapement wheels, back through lead 706 to spring contact 341N, through arm 506 of bell crank armature 336N to lead 710 and to common ground return lead 707, lead 708 and ground 709. The alternating impulses received on this circuit operate magnet 310N, and when the prolonged impuse comes in it actuates magnet 334N, attracting 336N which is locked up by catch 334N. Current through Na, however, closes contact through spring 342N, block 509 and 343N. Arm 336N being locked up these contacts are held in force after current through Na is broken by the sender.

Contacts 342N, 509 and 343N are in circuit N2, which derives current from the final circuit 618 of the sender. N2 starts at 701, follows lead 711 to 342N. All the units operate similarly and start simultaneously. When all have functioned all the contacts as 342P—343P, 342Q—343Q, and 342R—343R are closed in series to provide a path for current from 618, the final impulse which goes through lead 712 to magnet 437Z and back through lead 713 to common ground 707—708—709.

The functioning of magnet 437Z is similar to the function of magnet 437 previously described and the action of the printing crank and other parts is similar, and they are numbered similarly.

When two tickets are desired to be printed which are for adjoining seats and differ only by the seat numbers, or when tickets for seats in adjoining rows in a block are desired to be printed, I provide means for holding the main portion of the ticket printer wheels set, while only the smaller portion including the numbers is changed. This saves the operators considerable time, as only a few wheels at the ends need to be re-set.

In the diagrams in which these portions are shown Figs. 23, 24, 25, 26, only four units are indicated, the retained set portion consisting of two units and the changeable portion of two units, but any number of units may be included and the division made between them at any desired point.

Figs. 23 and 24 indicate the means used in connection with the single channel line, and Figs. 25, 26 the means used with the multiple channel line.

In Fig. 23 a switch, 143, is inserted in circuit

Aa1, in series. When this switch is closed, the circuit functions normally for the whole range of units. When the switch is opened circuit Aa1 is dead. The switch goes over and creates circuit 144. Circuit 144 comprises contact 145 of switch 143, lead to switch 63, switch contact at switch 63, contacts 133—114, battery 122 and leads to circuit Cc1, circuit 144 being in parallel with the leads to contact B19.

After transmitting an entire range of discs and after the printer is set to hold part of them and to re-set some, as 310G and 310H, the sender operator clears his machine with the manual clearing levers and sets keys for discs C1 and D1. The motor has been left running. He closes contact 145 with switch 143 and closes switch 63. Magnet A9 is thus by-passed and does not function, hence no signals can be sent by disc A1. As contact A19 is not closed, depending on A10 functioning, magnet B9 gets no current and disc B1 cannot function. Circuit 144—Cc1 energizes magnet C9. The operator then frees disc C and D of stop 64a. Disc C1 then sends current to line until the prolonged signal energizes magnet Cc20 and breaks the clutch magnet circuit, which in turn sets up the next circuit for disc D1. Any number of units may be by-passed at the outset and any desired number retained for the re-setting of the final typewheels of the printer.

In order to cause the printer to function in a corresponding manner, a by-pass unit is inserted between magnets 334F and 334G, in the line at point 519. This by-pass unit could be inserted elsewhere, as desired, to agree with a different setting of switch 143 of the sender.

The by-pass consists of the switch lever 367Z, magnets 373Z, switches and connections. The by-pass unit is switched in after the printer is set for a complete printing, but before the printing crank is turned. The following functions are brought into play to hold the typewheels desired to be held and to permit the clearing of the few to be re-set.

The operator cuts off the left hand units through breaking circuit 527 at switch 540. He also cuts off the left hand part of circuit 532 with switch 541. He also breaks line 519 with switches at three points, 542, 543, 544. The breaking of circuits 527 and 532 prevents any impulses from reaching the left hand units from the printing crank commutators, and so they remain set, without being cleared.

The operator now prints the ticket. In the function the units 310G and 310H clear. Switch starting lever 367 returns to contact 377, magnet 373 being energized by circuit 524. Armature 371 has an extra notch 546. Both notches are escaped by 367 when magnet 373 is energized.

In order to receive new impulses to set only units 310G and 310H, the operator turns the clearing crank 345, then throws lever 367 over to the point where it is caught by the second notch 546 of armature 371. This positions it in a median location, not making either contacts 376 or 377. No current can now pass to magnets 334E or 334F, and at the same time the line is not grounded. The operator then closes switch 545, setting up circuit E1Z, through lead 547 to 503Z and magnet 334G, which then functions in the same manner that magnet 334E functioned before.

When circuit E1Z is broken by the energizing of magnet 334G by the prolonged impulse, circuit E2Z is set up similar to circuit E2, through magnet 334G, lead 513Z to armature 354G, thus supplying the second circuit to keep magnet 334G energized. When contact 357G is broken by the sender, magnet 334G is by-passed by lead 516Z, similar to lead 516, to spring contact 520, and so on to lead 521 to magnet 334H, which then functions as when the whole range is operated. Units 310G and 310H are now set. The second ticket is now set up. If the operator desires no more tickets adjoining he cuts circuit E1Z by turning off switch 545, and remakes contacts at 540, 541, 543 and 544. He then turns the printing crank and the whole range of typewheels is cleared.

Magnet 373Z is in parallel with magnet 373, and when 367Z is freed and breaks contact 376Z, lever 367 is freed of the second notch 546 and 367 is returned to the initial position, while 367Z has cut out the by-pass unit, which can only be cut in again by the manual operation of 367Z.

Switch 548 is arranged to make and break contacts 540, 541, 542, 543 and 544 simultaneously.

In order to effect the same functioning in the high frequency channel wired apparatus, additions are made as indicated in Figs. 25 and 26.

In the sender Fig. 25, switch 621 is separately in series with 619 and 620, they being isolated from each other. As shown closed the switch permits normal operation of the whole range of sending discs. When it is opened it breaks contacts by magnets J9 and K9, which cannot then be energized by circuit 604. Units J1 and K1 are thus left idle and units L1 and M1 are free to function as before.

After setting the first ticket and before setting for the coupon of the second ticket, the clearing cranks 32 and 102 are turned. Keys for discs L1 and M1 are then set and the apparatus started as before.

In Fig. 26 the printer is provided with a supplementary switch arm 367Y, similar to 367X, except that it makes contacts for each of the magnet circuits to be operated thereafter while 367X supplies current for all. The switch arm 367Z will serve the purpose when fitted with extra contacts.

When the entire printer is set for the first ticket the operator does not at once print. He first breaks contact 714, cutting off circuit 527 from the units to the left, and he also cuts off the units to the left from circuit 532 by breaking contact 715. These circuits may be broken by switch 548 when it is not connected with 542, 543 and 544.

The printing of the first ticket now takes place. It frees units Q and R but cannot affect units N and P which remain set. In order to re-set 310Q and 310R for the coupon of the second ticket, the clearing crank 345 is rotated; lever arm 367X is closed to the second notch 546 and lever arm 367Y is set to the position shown in Fig. 26. The setting of lever arm 367X to point 546 insulates the circuits of units 334N and 334P from the line but does not ground the line as is the case when it is on contact 377.

The printer operator is now ready for current from the sender, and so notifies the sender operator by telephone.

Circuit Qa from line goes to magnet 334Q, then to contact 376Y at lever arm 367Y, thence through 705Y and 705Q2 to magnet 310Q which sets the typewheel, back through spring contact 341Q, to lead 710 and thence to common return 707. When the prolonged impulse comes magnet 334Q, is locked up and the circuit goes dead at the sender so that 310Q is not moved again.

Magnet 334R is operated similarly. When they are both locked up circuit N2Y is set up from lead in N2 at device 701, lead N2, lead N2Y to contact 716, through arm 367Y to N2Y joining 343P, which is isolated. It passes on to 342Q, 342R, 343R, and lead 712 to magnet 437Z and back by lead 713 to common return 707. This releases the printing crank for printing.

Before printing, in case no additional ticket of the same location is wanted, the operator restores contacts 714, 715, and in the case of Fig. 24, contacts 540, 541, 542, 543, 544 and breaks 545.

The printing then takes place and clears the wheels of the whole range. Magnet 373Y is in parallel with magnet 373X, and both levers 367X and 367Y are fully cleared and the line is grounded at 377X. Clearing crank 345 is rotated and the printer is ready for a new functioning.

In the specification and claims hereof the terms "earth" and "ground" used in connection with electrical circuits indicates either a connection to earth or a return by a metallic circuit. In references to electric currents and batteries, it is to be understood that a source of electrical energy is assumed and that it may be either a battery or other convenient source.

It is to be understood throughout the claims that the singular implies the plural and the plural the singular where the context so indicates.

What I claim is:

1. In a printing telegraph system a printer comprising a plurality of escapement typewheel units, means whereby they are adapted to be set at selected printing points upon the reception of a train of alternating signals in groups, one group for each unit; means for deriving from line the group for the first typewheel unit, and automatic means adapted to cut from line said typewheel unit, and to transfer automatically each of the next succeeding typewheel units to line upon the completion of the group of signals of the next prior unit, and means for printing from the typewheels set up upon the completion of their setting.

2. In a printing telegram system a transmitter adapted to send to line groups of alternating signals, each group derived from one of a plurality of transmitting units, means for driving such units, manual means for permitting the first unit to start and automatic means adapted to transfer each of the next succeeding units to line upon the completion of the signals of the prior unit, a printer, a line from the transmitter to the printer, said printer comprising a plurality of escapement typewheel units means whereby they are adapted to be set at selected printing points upon the reception of a train of alternating signals in groups, one group derived from each unit of the transmitter and adapted to set one unit of the printer; means for deriving from line the first of said groups, adapted to operate and set the first typewheel unit, and automatic means adapted to cut from line said first typewheel unit and to transfer automatically each of the next succeeding typewheel units to line upon the completion of the group of signals of the next prior unit; and means for printing from the typewheels set up upon the completion of their setting, and automatic means adapted thereupon to return such typewheels to their initial positions.

3. In a telegraph printing system, a printer comprising a series of printing units, escapement means adapted to set said units at selected printing points, as determined by a series of groups of alternating electric impulses, each group comprising a succession of alternating electric impulses, of selected number and a prolongation of the final impulse, said groups being separated by a space electrically dead, and automatic means adapted to cut from line the unit in operation upon the reception of the prolonged signal and automatic means adapted thereupon to put the next unit to line, successively to the final unit.

4. In a telegraphic printing system a printer of the class described in claim 3 with means adapted to print from the set units upon the completion of the setting thereof.

5. A telegraphic printer comprising a plurality of typewheels, escapement means adapted to set the several typewheels at selected locations, means to connect the line to the first unit, automatic means to cut said unit from line and cut in the next unit upon the termination of the setting of the prior unit, and manually operable means for printing from said set typewheels upon completion of their setting, and automatic means adapted to return said typewheels to their initial positions upon the completion of said printing.

6. A telegraphic printer comprising a plurality of typewheels with symbols for printing from their peripheries; a corresponding plurality of script wheels bearing on their peripheries script symbols corresponding to the type of the typewheels, adapted to show to an observer of the script wheels' peripheries at the exhibition point the symbols about to be printed at the printing point.

7. In a telegraph printer, a first shaft having gears frictionally mounted thereon, means for driving said shaft, a second shaft having a plurality of gears rotatably mounted thereon in engagement with the gears of the first shaft, said second shaft being fixed and said gears rotatable thereon, script wheels affixed to said gears bearing on their peripheries script symbols; a third shaft, fixed, with gears equal in number to the script wheels and in engagement therewith; a fourth shaft, fixed, with a plurality of typewheels mounted to rotate thereon, said typewheels bearing type on their peripheries corresponding to the symbols of the script wheels, said typewheels having gears affixed, in engagement with the gears of the third shaft, and means to stop said typewheels at selected locations through the instrumentality of groups of signals from line, said gears and wheels driven from the first shaft.

8. In a telegraphic printer, a plurality of trains of gears, script wheels and typewheels and connections comprising in each train a driving gear frictionally connected to a driving shaft, a gear driven thereby, said gear carrying a script wheel, said script wheel supplied with symbols arranged on its periphery, an intermediate gear driven by said script wheel gear, a gear driven by said intermediate gear, adapted to carry a typewheel, said typewheel with type on its periphery corresponding to the symbols of the script wheel; a gear fixed on a rotatable shaft, said shaft carrying a pair of escapement wheels fixed to said shaft, said gear driven by said typewheel gear, and means adapted to stop said escapement shaft at selected angular locations.

9. The matter of claim 8 including an escapement unit comprising said pair of escapement wheels, said escapement wheels provided with teeth staggered with respect to each other by half the pitch of a tooth; an arm adapted to oscillate between said teeth whereby to permit their escape from oscillation to oscillation, and means for controlling the oscillations of said arm to stop said escapement at a selected location.

10. In a telegraphic printing system with a transmitter having a plurality of transmitting units, a line, and a printer with a plurality of typewheel units adapted to be set at the printing point by signals from said transmitter units, said printing units adapted to be automatically cleared or returned to their initial positions immediately upon the printing function occuring; means adapted to hold a portion of said type units in their set position upon the printing function occurring, while permitting the remaining type units to be cleared automatically, and means adapted to re-set said cleared type units, whereby to provide for the printing of a second print with a portion of the symbols of the first print thereon, without re-setting the entire range of type units on the printer.

11. In a telegraphic printing system printer comprising a plurality of printing units each adapted to be set at a selected printing point by a group of signals from a transmitter, said printer units adapted to be automatically cleared or returned to their initial positions upon the functioning of the printing element; means adapted to retain a portion of said type units in their set positions while allowing the remainder to be automatically cleared upon the taking place of the printing function and means adapted to re-set, from the transmitter, the cleared units, whereby to provide for the printing of a second print with a portion of the symbols of the prior print thereon, without re-setting the entire range of type units on the printer.

12. In a telegraphic printing system having a transmitter with a plurality of transmitting units, a line and a printer with a plurality of printing units adapted to be set at the selected printing points by signals from said transmitter, said printing units adapted to be cleared or returned to their initial positions on the functioning of the printing element, automatically; a plurality of high frequency electric current channels on said line adapted to transmit signals for each pair of transmitter-printer units separately, independently and simultaneously; means adapted to retain a portion of the type units in the printing position while automatically clearing the remainder by the action co-incident with the functioning of the printing element, and means to re-set the cleared units from signals from the transmitter; whereby to enable a second printing to be made including a portion of the prior printing without requiring the re-setting of the entire range of printing units.

13. An escapement unit adapted to permit a shaft to rotate by small degrees intermittently, and at selected times to permit the said shaft to rotate for the remainder of one revolution from the angular attitude it then has, said unit comprising said shaft, two toothed wheels mounted thereon near each other, at an attitude of half the pitch of a tooth apart angularly speaking, an escapement stop arm adapted to oscillate between said toothed wheels whereby to permit them to rotate the pitch of one tooth upon a complete oscillation from one to the other and back; a polarized magnet adapted to receive alternating impulses of current from a transmitter unit over the line and adapted to cause the oscillations of said escapement stop arm, one half oscillation with each pulse or side of said alternating current alternation; said polarized magnet adapted to retain said escapement stop arm in the position in which the last pulse leaves it after current is cut off; a magnet adapted to operate on local direct current; said escapement stop arm mounted in a cradle, adapted to permit it to rotate back and forth, and said cradle adapted to move it up and down, whereby to lift it out of the line of the regular teeth of said toothed wheels, said wheels having regular teeth for a large part of their periphery, then a toothless space even with the bottom of the teeth, and a high tooth on one of the said wheels, said local current magnet adapted to move said cradle to tilt said arm out of the line of said regular teeth, a spring in opposition thereto, whereby to return said arm on the de-energization of said local magnet, said local magnet adapted to tilt said arm on energization, two electric contact springs in series in the circuit of said local magnet, one of said springs adapted to be drawn away from the other and thereby break the local magnet circuit, whereby to lower said arm and stop said shaft rotating by contact of said arm with said high tooth; a cam on said shaft adapted at a selected angular attitude to draw one of said springs away from the other and break said local circuit and adapted to permit said contact to be remade by allowing said spring to return to said contact with other said spring at a later angular attitude, and means between said attitudes while said springs are still apart to break said local circuit current elsewhere.

14. In a printer of the class described a plurality of latch magnets, each having an armature carried on the lower perpendicular arm of a bell crank lever, the upper horizontal arm of said lever carrying on its under side two contact blocks isolated electrically, one adapted when the magnet is in the normal de-energized position to make contact between a first and a second contact spring and the second block adapted to make contact with a third contact spring and through arm and axis of said bell crank lever to common return lead to line ground; the upper side of said arm carrying a contact block adapted to make a contact between a fourth and fifth contact spring when said magnet is energized and said horizontal arm is tilted; said magnet adapted to be energized by the prolonged impulse of the alternating signal group passing through it, and adapted when ergized to break the contacts on the lower side of said horizontal arm and make the contacts on the upper side thereof, and a latch adapted to automatically lock said bell crank lever in the position taken when said magnet is energized, whereby to hold said underside contacts permanently broken and said upper side contacts permanently made.

15. In conjunction with a plurality of latch magnets as set forth in claim 14, having latches adapted to lock automatically their amature carrying bell crank levers in the position taken when said magnets are energized, a universal shaft having a crank and being thereby adapted to be manually rotated, said shaft bearing a plurality of cams affixed thereto, adapted upon rotation each to depress one latch of a latch magnet of said group, whereby to release or clear said bell crank levers from said latches, and said bell crank levers adapted to be drawn into their initial positions upon being released.

16. In a printer of the class described a plurality of pairs of lock-up magnets, each adapted to lock up and break a circuit through one, said pair comprising a primary magnet and a secondary magnet, said primary magnet in the line circuit and adapted to pass alternating impulses and only be energized on the reception of the prolonged impulse, said primary magnet upon energization adapted to close a contact for a circuit in parallel with the primary magnet's circuit, said contact on the inner side of its armature; said armature provided on the outer side with a contact block, adapted to complete a contact between a sixth and seventh contact spring when said armature is in the released position, and adapted to break said contact when attracted by its magnet, whereby to prevent the setting up of a by-pass parallel circuit to the next printing unit; said secondary magnet provided with an armature in the form of a bell crank lever, one arm serving as the armature and the other bearing a catch adapted to lock up the armature of the primary magnet in its closed position upon the energization of the secondary magnet and hold it locked upon the de-energization of the primary magnet and until the circuit of the secondary magnet is broken at the transmitter, whereupon said primary magnet's armature is released, and is adapted to form the circuit between the sixth and seventh spring contacts, whereby to by-pass the instant printing unit whose function is now complete and pass the line current to the next printing unit.

17. In a telegraphic printer of the class described having a plurality of typewheels adapted to be set at selected printing points, means adapted to hold a portion of the said typewheels in a selected position while changing the printing points of the remainder of the typewheels, comprising a primary starting lever and its armature catch magnet, said armature catch provided with two catches, one adapted to hold said lever in the closed position, and one adapted to hold it in an intermediate position free of any contacts; a secondary starting lever and its armature catch magnet, placed in the main line between selected units, with a lead to the latch magnet subsequent to said secondary printing lever, whereby to by-pass the units between the two starting levers, said secondary starting lever, magnet, connections and functions being related to the units subsequent to it in the same manner as the initial starting lever is related to the units following it through the mechanism, and a switch adapted to cut off electrical circuits of the instrumentalities prior to the secondary starting lever, whereby, upon the functioning of the printing shaft to hold the prior instrumentalities at the same printing point and to clear the typewheels subsequent to the secondary starting lever, and to permit them to be re-set by the transmitter while the prior typewheels are held in the same position for the second printing.

EDWIN HOPKINS.